United States Patent
Wang et al.

(10) Patent No.: US 9,924,374 B2
(45) Date of Patent: Mar. 20, 2018

(54) METHOD AND APPARATUS FOR TRANSMITTING DATA

(71) Applicant: Huawei Technologies Co., Ltd., Shenzhen (CN)

(72) Inventors: Jueping Wang, Shanghai (CN); Si Zhang, Shanghai (CN); Wei Wang, Shanghai (CN); Yong Wang, Shanghai (CN); Mo Chen, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/197,362

(22) Filed: Jun. 29, 2016

(65) Prior Publication Data

US 2016/0309338 A1    Oct. 20, 2016

Related U.S. Application Data

(63) Continuation of application No. PCT/CN2013/091009, filed on Dec. 31, 2013.

(51) Int. Cl.
*H04W 16/18* (2009.01)
*H04B 1/38* (2015.01)

(52) U.S. Cl.
CPC .............. *H04W 16/18* (2013.01); *H04B 1/38* (2013.01)

(58) Field of Classification Search
CPC ........ H04B 10/27; H04B 1/74; H04B 7/2606; H04B 7/15557; H04W 88/085
See application file for complete search history.

(56) References Cited

U.S. PATENT DOCUMENTS 5,930,726 A * 7/1999 Fujita .................... H04W 16/26
455/20
6,310,705 B1 * 10/2001 Lee ........................ H04B 1/18
379/56.1

(Continued)

FOREIGN PATENT DOCUMENTS

CN        1213258 A    4/1999
CN        1224986 A    8/1999

(Continued)

*Primary Examiner* — Dung Hong
(74) *Attorney, Agent, or Firm* — Leydig, Voit & Mayer, Ltd.

(57) ABSTRACT

Embodiments of the present invention disclose a method and an apparatus for transmitting data. The apparatus for transmitting data includes a high frequency radio unit HFRU that is in a communication connection with a site, and a shift frequency radio unit SFRU that is in a communication connection with the HFRU and with a user equipment, where the HFRU includes a high frequency radio unit—indoor device unit HFRU-IDU and a high frequency radio unit—outdoor device unit HFRU-ODU that connects to the HFRU-IDU, and the SFRU includes a high frequency band transceiver and a wireless cellular band transceiver. By converting to-be-transmitted data into intermediate frequency signals for transmission, the method and apparatus for transmitting data according to the embodiments of the present invention can remarkably reduce a data transmission bandwidth, thereby saving bandwidth resources, reducing a data transmission cost, and reducing a device deployment cost.

15 Claims, 11 Drawing Sheets

(56) References Cited

U.S. PATENT DOCUMENTS

| | | | |
|---|---|---|---|
| 6,340,200 B1 | 8/2002 | Enomoto et al. | |
| 6,430,200 B1 | 8/2002 | Han et al. | |
| 6,477,154 B1 | 11/2002 | Cheong et al. | |
| 6,731,946 B1* | 5/2004 | Stanwood | H04W 84/14 370/280 |
| 7,123,649 B1* | 10/2006 | Smith | H04M 11/066 375/222 |
| 2002/0102948 A1* | 8/2002 | Stanwood | H04B 7/2621 455/91 |
| 2002/0111161 A1* | 8/2002 | Bourlas | H04B 1/74 455/423 |
| 2002/0119797 A1* | 8/2002 | Woodhead | H04W 52/24 455/522 |
| 2003/0104781 A1* | 6/2003 | Son | H04B 7/15514 455/22 |
| 2003/0185287 A1* | 10/2003 | Ogawa | H04B 3/36 375/211 |
| 2005/0175037 A1* | 8/2005 | Porter | H04J 3/0632 370/503 |
| 2005/0207403 A1* | 9/2005 | Katayama | H04B 10/27 370/352 |
| 2008/0063397 A1* | 3/2008 | Hu | H04J 14/0282 398/43 |
| 2008/0090578 A1 | 4/2008 | Gromakov | |
| 2008/0317464 A1* | 12/2008 | Li | H04W 88/08 398/43 |
| 2011/0135308 A1* | 6/2011 | Tarlazzi | H04B 7/0413 398/79 |
| 2012/0042345 A1* | 2/2012 | Tjio | H04L 12/2801 725/63 |
| 2012/0100801 A1* | 4/2012 | Yuan | H04B 7/18515 455/14 |
| 2012/0220246 A1 | 8/2012 | Kushnir et al. | |
| 2013/0094438 A1* | 4/2013 | Ridel | H04W 88/085 370/328 |
| 2013/0136163 A1 | 5/2013 | Friedmann et al. | |
| 2013/0188753 A1* | 7/2013 | Tarlazzi | H04B 7/024 375/299 |
| 2013/0322251 A1* | 12/2013 | Kotecha | H04W 28/24 370/236 |
| 2015/0207558 A1* | 7/2015 | Braz | H04B 7/15542 370/315 |

FOREIGN PATENT DOCUMENTS

| | | |
|---|---|---|
| CN | 101006665 A | 7/2007 |
| CN | 102355297 A | 2/2012 |
| WO | WO 2013142662 A2 | 9/2013 |

\* cited by examiner

METHOD AND APPARATUS FOR TRANSMITTING DATA

CROSS-REFERENCE TO RELATED APPLICATIONS

This application is a continuation of International Application No. PCT/CN2013/091009, filed on Dec. 31, 2013, which is hereby incorporated by reference in its entirety.

TECHNICAL FIELD

Embodiments of the present invention relate to the field of communications, and in particular, to a method and an apparatus for transmitting data in the field of communications.

BACKGROUND

A macro-micro collaborative networking system is a heterogeneous network (HetNet). The system can effectively resolve wireless network coverage problems, and can increase network throughput and improve user experience. In a cell covered by a macro base station, a deployed micro base station may be used to absorb hotspot services, supplement coverage of coverage holes, and so on. Digital baseband processing of the macro base station and the micro base station may be completed in the macro base station, that is, the macro base station includes a radio frequency transceiver module of the macro base station and a baseband processing module that provides a digital processing function for the macro base station and the micro base station, and the baseband processing module is mainly configured to process digital functions, for example, to execute the functions of channel coding and decoding and digital modulation and demodulation; and the micro base station site located at a remote end mainly includes a radio frequency transceiver module. Data transmission between a macro base station and a micro base station is one of key technologies of a macro-micro collaborative networking system.

An existing communication between a micro base station and a macro base station is mainly based on a common public radio interface (CPRI) protocol. An interface between a radio frequency transceiver module of the micro base station and a baseband processing unit is generally also a CPRI interface.

Currently, methods for transmitting data between a micro base station and a macro base station mainly include an optical fiber transmission method and a microwave transmission method. For the microwave transmission method, a data communication between the micro base station and a baseband processing unit of the macro base station is implemented by means of microwave transmission, and transmitted data is CPRI protocol data based on the CPRI protocol. This solution requires a very high data transmission bandwidth but a microwave transmission bandwidth is limited, which causes a great technical difficulty in meeting a bandwidth requirement for transmitting CPRI protocol data, and a high transmission cost.

SUMMARY

In view of this, embodiments of the present invention provide a method and an apparatus for transmitting data, so as to remarkably reduce a data transmission bandwidth and reduce a data transmission cost.

According to a first aspect, an apparatus for transmitting data is provided, where the apparatus for transmitting data includes a high frequency radio unit HFRU that is in a communication connection with a site, and a shift frequency radio unit SFRU that is in a communication connection with the HFRU and with a user equipment, the HFRU includes a high frequency radio unit—indoor device unit HFRU-IDU and a high frequency radio unit—outdoor device unit HFRU-ODU that connects to the HFRU-IDU, and the SFRU includes a high frequency band transceiver and a wireless cellular band transceiver, where: the HFRU-IDU is configured to convert data sent by the site into a downstream intermediate frequency analog signal and send the downstream intermediate frequency analog signal to the HFRU-ODU; the HFRU-ODU is configured to convert the downstream intermediate frequency analog signal sent by the HFRU-IDU into a downstream high frequency signal and send the downstream high frequency signal to the SFRU by using an air interface; the high frequency band transceiver is configured to convert the downstream high frequency signal sent by the HFRU-ODU into a downstream intermediate frequency signal and send the downstream intermediate frequency signal to the wireless cellular band transceiver; and the wireless cellular band transceiver is configured to convert the downstream intermediate frequency signal sent by the high frequency band transceiver into a downstream wireless cellular signal and send the downstream wireless cellular signal to the user equipment.

With reference to the first aspect, in a first possible implementation manner of the first aspect, the wireless cellular band transceiver is further configured to convert an upstream wireless cellular signal sent by the user equipment into an upstream intermediate frequency signal and send the upstream intermediate frequency signal to the high frequency band transceiver; the high frequency band transceiver is further configured to convert the upstream intermediate frequency signal sent by the wireless cellular band transceiver into an upstream high frequency signal and send the upstream high frequency signal to the HFRU-ODU; the HFRU-ODU is further configured to convert the upstream high frequency signal sent by the high frequency band transceiver into an upstream intermediate frequency analog signal and send the upstream intermediate frequency analog signal to the HFRU-IDU; and the HFRU-IDU is further configured to convert the upstream intermediate frequency analog signal sent by the HFRU-ODU into an upstream intermediate frequency digital signal and send the upstream intermediate frequency digital signal to the site.

With reference to the first aspect, in a second possible implementation manner of the first aspect, the HFRU-IDU includes a common public radio interface CPRI deframing/framing module and a first digital/analog converter, where the CPRI deframing/framing module is configured to acquire a downstream intermediate frequency digital signal from CPRI protocol data sent by the site, and the first digital/analog converter is configured to convert the downstream intermediate frequency digital signal into the downstream intermediate frequency analog signal, where the first digital/analog converter is further configured to convert the upstream intermediate frequency analog signal sent by the HFRU-ODU into the upstream intermediate frequency digital signal, and the CPRI deframing/framing module is further configured to convert the upstream intermediate frequency digital signal into a CPRI data frame.

With reference to the second possible implementation manner of the first aspect, in a third possible implementation manner of the first aspect, the HFRU-IDU further includes a data rate conversion module, where the data rate conversion module is configured to match a data rate of the downstream intermediate frequency digital signal or the upstream intermediate frequency digital signal processed by the CPRI deframing/framing module with a data rate of the downstream intermediate frequency digital signal or the upstream intermediate frequency digital signal processed by the first digital/analog converter.

With reference to the first aspect, in a fourth possible implementation manner of the first aspect, the HFRU-ODU includes a first frequency mixer and a first power amplifier, where the first frequency mixer is configured to convert the downstream intermediate frequency analog signal into the downstream high frequency signal and convert the upstream high frequency signal into the upstream intermediate frequency analog signal, and the first power amplifier is configured to amplify the downstream high frequency signal output by the first frequency mixer so as to send the downstream high frequency signal to the SFRU.

With reference to the first aspect, in a fifth possible implementation manner of the first aspect, the high frequency band transceiver includes a second frequency mixer and a second power amplifier, where the second frequency mixer is configured to convert the downstream high frequency signal into the downstream intermediate frequency signal and convert the upstream intermediate frequency signal into the upstream high frequency signal, and the second power amplifier is configured to amplify the upstream high frequency signal output by the second frequency mixer so as to send the upstream high frequency signal to the HFRU-ODU.

With reference to the first aspect, in a sixth possible implementation manner of the first aspect, the wireless cellular band transceiver includes a third frequency mixer and a third power amplifier, where the third frequency mixer is configured to convert the downstream intermediate frequency signal into the downstream wireless cellular signal and convert the upstream wireless cellular signal sent by the user equipment into the upstream intermediate frequency signal, and the third power amplifier is configured to amplify the downstream wireless cellular signal output by the third frequency mixer so as to send the downstream wireless cellular signal to the user equipment.

With reference to the fifth possible implementation manner of the first aspect, in a seventh possible implementation manner of the first aspect, the high frequency band transceiver further includes a second digital/analog converter and an SFRU configuration module, where the second digital/analog converter is configured to perform mutual conversions between an intermediate frequency analog signal and an intermediate frequency digital signal; the SFRU configuration module is configured to control the SFRU according to the configuration management information sent by the HFRU; and the SFRU configuration module is further configured to send status information about the SFRU to the HFRU.

With reference to the sixth possible implementation manner of the first aspect, in a eighth possible implementation manner of the first aspect, the wireless cellular band transceiver further includes a third digital/analog converter, where the third digital/analog converter is configured to convert a downstream intermediate frequency digital signal sent by the high frequency band transceiver into a downstream intermediate frequency analog signal, so that the third frequency mixer converts the downstream intermediate frequency analog signal generated by the third digital/analog converter into the downstream wireless cellular signal; and the third digital/analog converter is further configured to convert an upstream intermediate frequency analog signal generated by the third frequency mixer into an upstream intermediate frequency digital signal, so that the upstream intermediate frequency digital signal generated by the third digital/analog converter is sent to the high frequency band transceiver.

With reference to the first aspect or any one of the first to eighth possible implementation manners of the first aspect, in a ninth possible implementation manner of the first aspect, the HFRU further includes a first compensation module and the high frequency band transceiver further includes a second compensation module, where the first compensation module is configured to add downstream phase noise compensation information about an emission local oscillator of the HFRU to a signal that is sent to the SFRU, and the second compensation module is configured to acquire the downstream phase noise compensation information from a signal sent by the HFRU-ODU so as to perform compensation correction on the signal sent by the HFRU-ODU, where the second compensation module is further configured to add upstream phase noise compensation information about an emission local oscillator of the SFRU to a signal that is sent to the HFRU-ODU, and the first compensation module is further configured to acquire the upstream phase noise compensation information from the signal sent by the high frequency band transceiver so as to perform compensation correction on the signal sent by the high frequency band transceiver.

According to a second aspect, a method for transmitting data is provided, where the method includes: receiving, by a high frequency radio unit HFRU, data sent by a site; converting, by the HFRU, the data sent by the site into a downstream intermediate frequency analog signal, and converting the downstream intermediate frequency analog signal into a downstream high frequency signal; sending, by the HFRU, the downstream high frequency signal to a shift frequency radio unit SFRU by using an air interface; converting, by the SFRU, the downstream high frequency signal into a downstream intermediate frequency signal, and converting the downstream intermediate frequency signal into a downstream wireless cellular signal; and sending, by the SFRU, the downstream wireless cellular signal to a user equipment.

With reference to the second aspect, in a first possible implementation manner of the second aspect, the converting, by the HFRU, the data sent by the site into a downstream intermediate frequency analog signal includes: acquiring, by the HFRU, a downstream intermediate frequency digital signal from common public radio interface CPRI protocol data sent by the site, and converting the downstream intermediate frequency digital signal into a downstream intermediate frequency analog signal.

With reference to the second aspect, in a second possible implementation manner of the second aspect, the method further includes: determining, by the HFRU, downstream phase noise compensation information about an emission local oscillator of the HFRU; sending, by the HFRU, the downstream phase noise compensation information to the SFRU; and performing, by the SFRU according to the downstream phase noise compensation information, compensation correction on the downstream high frequency signal sent by the HFRU.

With reference to the second aspect, the first possible implementation manner of the second aspect, or the second possible implementation manner of the second aspect, in a third possible implementation manner of the second aspect, the method further includes: sending, by the HFRU, configuration management information about the SFRU to the SFRU; and controlling, by the SFRU, the SFRU according to the configuration management information.

According to a third aspect, a method for transmitting data is provided, where the method includes: receiving, by a shift frequency radio unit SFRU, an upstream wireless cellular signal sent by a user equipment; converting, by the SFRU, the upstream wireless cellular signal into an upstream intermediate frequency signal, and converting the upstream intermediate frequency signal into an upstream high frequency signal; sending, by the SFRU, the upstream high frequency signal to a high frequency radio unit HFRU by using an air interface; converting, by the HFRU, the upstream high frequency signal sent by the SFRU into an upstream intermediate frequency analog signal, and converting the upstream intermediate frequency analog signal into an upstream intermediate frequency digital signal; and sending, by the HFRU, the upstream intermediate frequency digital signal to a site.

With reference to the third aspect, in a first possible implementation manner of the third aspect, the sending, by the HFRU, the upstream intermediate frequency digital signal to a site includes: converting, by the HFRU, the upstream intermediate frequency digital signal into a common public radio interface CPRI data frame, and sending the CPRI data frame to the site.

With reference to the third aspect, in a second possible implementation manner of the third aspect, the method further includes: determining, by the SFRU, upstream phase noise compensation information about an emission local oscillator of the SFRU; sending, by the SFRU, the upstream phase noise compensation information to the HFRU; and performing, by the HFRU according to the upstream phase noise compensation information, compensation correction on the upstream high frequency signal sent by the SFRU.

With reference to the third aspect, or the first or the second possible implementation manner of the third aspect, in a third possible implementation manner of the third aspect, the method further includes: determining, by the SFRU, status information about the SFRU; and sending, by the SFRU, the status information to the HFRU.

According to a fourth aspect, a high frequency radio unit HFRU is provided, where the HFRU includes a processor, a memory, a bus system, a receiver, and a sender, where: the processor, the memory, the receiver, and the sender are connected by using the bus system; the memory is configured to store an instruction; the processor is configured to execute the instruction stored in the memory so as to control signal receiving of the receiver and control signal sending of the sender; the receiver is configured to receive data sent by a site; the processor is configured to convert the data sent by the site into a downstream intermediate frequency analog signal and convert the downstream intermediate frequency analog signal into a downstream high frequency signal; and the sender is configured to send the downstream high frequency signal to a shift frequency radio unit SFRU by using an air interface.

With reference to the fourth aspect, in a first possible implementation manner of the fourth aspect, that the processor converts data sent by the site into a downstream intermediate frequency analog signal includes: the processor acquires a downstream intermediate frequency digital signal from common public radio interface CPRI protocol data sent by the site and converts the downstream intermediate frequency digital signal into the downstream intermediate frequency analog signal.

With reference to the fourth aspect, in a second possible implementation manner of the fourth aspect, the processor is further configured to determine downstream phase noise compensation information about an emission local oscillator of the HFRU, and the sender is further configured to send the downstream phase noise compensation information to the SFRU.

With reference to the fourth aspect, in a third possible implementation manner of the fourth aspect, the sender is further configured to send configuration management information about the SFRU to the SFRU.

With reference to the fourth aspect, in a fourth possible implementation manner of the fourth aspect, the receiver is further configured to receive an upstream high frequency signal sent by the SFRU; the processor is further configured to convert the upstream high frequency signal into an upstream intermediate frequency analog signal and convert the upstream intermediate frequency analog signal into an upstream intermediate frequency digital signal; and the sender is further configured to send the upstream intermediate frequency digital signal to the site.

With reference to the fourth possible implementation manner of the fourth aspect, in a fifth possible implementation manner, the processor is further configured to convert the upstream intermediate frequency digital signal into a common public radio interface CPRI data frame, and that the sender sends the upstream intermediate frequency digital signal to the site is that the sender sends the CPRI data frame to the site.

With reference to the fourth possible implementation manner of the fourth aspect, in a sixth possible implementation manner, the receiver is further configured to receive upstream phase noise compensation information sent by the SFRU, and the processor is further configured to perform compensation correction on the upstream high frequency signal according to the upstream phase noise compensation information.

With reference to the fourth possible implementation manner of the fourth aspect, in a seventh possible implementation manner, the receiver is further configured to receive status information about the SFRU that is sent by the SFRU.

According to a fifth aspect, a shift frequency radio unit SFRU is provided, where the SFRU includes a processor, a memory, a bus system, a receiver, and a sender, where: the processor, the memory, the receiver, and the sender are connected by using the bus system; the memory is configured to store an instruction; the processor is configured to execute the instruction stored in the memory so as to control signal receiving of the receiver and control signal sending of the sender; the receiver is configured to receive a downstream high frequency signal sent by using an air interface by a high frequency radio unit HFRU; the processor is configured to convert the downstream high frequency signal into a downstream intermediate frequency signal and convert the downstream intermediate frequency signal into a downstream wireless cellular signal; and the sender is configured to send the downstream wireless cellular signal to a user equipment.

With reference to the fifth aspect, in a first possible implementation manner of the fifth aspect, the receiver is further configured to receive downstream phase noise compensation information sent by the HFRU, and the processor is further configured to perform compensation correction on the downstream high frequency signal according to the downstream phase noise compensation information.

With reference to the fifth aspect, in a second possible implementation manner of the fifth aspect, the receiver is further configured to receive configuration management information about the SFRU that is sent by the HFRU, and the processor is further configured to control the SFRU according to the configuration management information.

With reference to the fifth aspect, in a third possible implementation manner of the fifth aspect, the receiver is further configured to receive an upstream wireless cellular signal sent by the user equipment; the processor is further configured to convert the upstream wireless cellular signal into an upstream intermediate frequency signal and convert the upstream intermediate frequency signal into an upstream high frequency signal; and the sender is further configured to send the upstream high frequency signal to the HFRU by using an air interface.

With reference to the third possible implementation manner of the fifth aspect, in a fourth possible implementation manner, the processor is further configured to determine upstream phase noise compensation information about an emission local oscillator of the SFRU, and the sender is further configured to send the upstream phase noise compensation information to the HFRU.

With reference to the third possible implementation manner of the fifth aspect, in a fifth possible implementation manner, the processor is further configured to determine status information about the SFRU, and the sender is further configured to send the status information to the HFRU. Based on the foregoing technical solution, by converting to-be-transmitted data into intermediate frequency signals for transmission, the method and the apparatus for transmitting data according to embodiments of the present invention can remarkably reduce data transmission bandwidth, thereby saving bandwidth resources and reducing a data transmission cost.

BRIEF DESCRIPTION OF DRAWINGS

To describe the technical solutions in the embodiments of the present invention more clearly, the following briefly introduces the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly and completely describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present disclosure.

It should be understood that, the technical solutions in the embodiments of the present invention may be applied to various communications systems, such as: a Global System for Mobile Communications (GSM) system, a Code Division Multiple Access (CDMA) system, a Wideband Code Division Multiple Access (WCDMA) system, a general packet radio service (GPRS), a Long Term Evolution (LTE) system, an LTE frequency division duplex (FDD) system, an LTE time division duplex (TDD), and a Worldwide Interoperability for Microwave Access (WiMAX) communications system.

In the embodiments of the present invention, a site may be a base transceiver station (BTS) in GSM or CDMA, may also be a NodeB (NB) in WCDMA, and may further be an evolved NodeB (ENB or eNB) in LTE, and the site may also be a macro base station or a micro base station, which is not limited in the present disclosure. However, for ease of description, the following embodiments are described by using a macro base station as an example.

It should also be understood that in the embodiments of the present invention, a user equipment (UE) may be referred to as a terminal, a terminal equipment, a mobile station (MS), a mobile terminal, or the like. The user equipment may communicate with one or more core networks by using a radio access network (RAN). For example, the user equipment may be a mobile phone (or referred to as a "cellular" phone), or a computer with a mobile terminal; for example, the user equipment may also be a portable, pocket-sized, handheld, computer built-in, or vehicle-mounted mobile apparatus, which exchanges voice and/or data with the radio access network. The present disclosure, however, is not limited thereto.

Figure 1:
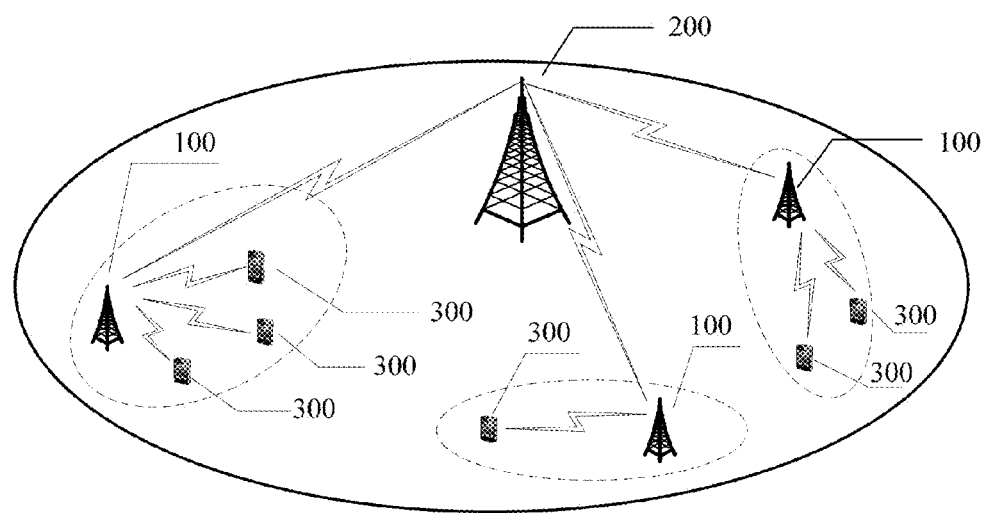
FIG. 1 is a schematic diagram of an application scenario of a method and an apparatus for transmitting data according to an embodiment of the present invention.

FIG. 1 shows a schematic diagram of an application scenario of a method and an apparatus for transmitting data according to an embodiment of the present invention.

According to a communication system shown in FIG. 1, the communication system is, for example, a heterogeneous network system. Specifically, the communication system may be a macro-micro collaborative networking system. As shown in FIG. 1, the communication system may include a macro base station 200, and one or more apparatuses 100 for transmitting data and user equipments 300 according to embodiments of the present invention. An apparatus 100 is in a communication connection with the macro base station 200, and each apparatus 100 provides communication services for one or more user equipments 300 within a coverage range of the apparatus 100, that is, the apparatus 100 is configured to receive downstream data sent by the macro base station 200 and send the downstream data to a user equipment 300. On the other hand, the apparatus 100 is further configured to receive upstream data sent by the user equipment 300 and send the upstream data to the macro base station 200.

For ease of description, the embodiment of the present invention uses an architecture of a macro-micro collaborative networking system as an example for description. The present disclosure, however, is not limited thereto.

Figure 2:
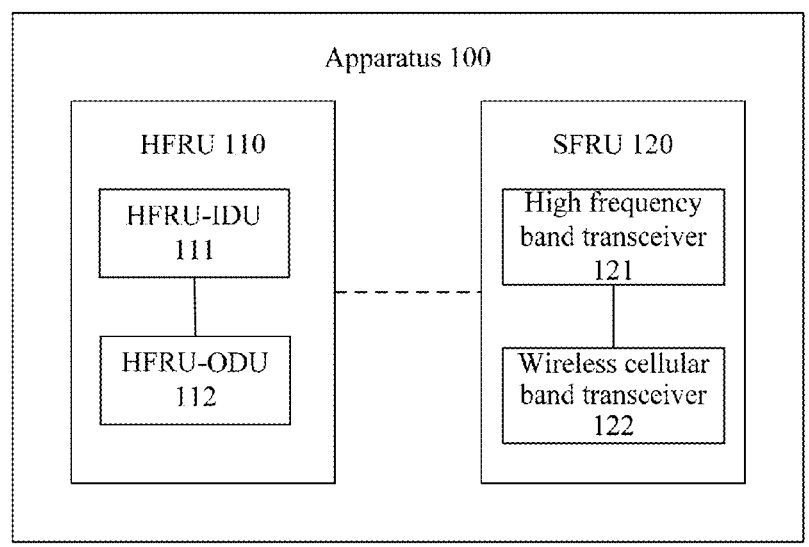
FIG. 2 is a schematic block diagram of an apparatus according to an embodiment of the present invention.

FIG. 2 shows a schematic block diagram of an apparatus 100 for transmitting data according to an embodiment of the present invention. As shown in FIG. 2, the apparatus 100 for transmitting data includes:

a high frequency radio unit (HFRU) 110 that is in a communication connection with a site 200; and a shift frequency radio unit (SFRU) 120 that is in a communication connection with the HFRU 110 and with a user equipment 300.

The HFRU 110 includes a high frequency radio unit—indoor device unit (HFRU-IDU) 111 and a high frequency radio unit—outdoor device unit (HFRU-ODU) 112 that connects to the HFRU-IDU 111, and the SFRU 120 includes a high frequency band transceiver 121 and a wireless cellular band transceiver 122, where:

the HFRU-IDU 111 is configured to convert data sent by the site 200 into a downstream intermediate frequency analog signal and send the downstream intermediate frequency analog signal to the HFRU-ODU 112;

the HFRU-ODU 112 is configured to convert the downstream intermediate frequency analog signal sent by the HFRU-IDU 111 into a downstream high frequency signal and send the downstream high frequency signal to the SFRU 120 by using an air interface;

the high frequency band transceiver 121 is configured to convert the downstream high frequency signal sent by the HFRU-ODU 112 into a downstream intermediate frequency signal and send the downstream intermediate frequency signal to the wireless cellular band transceiver 122; and the wireless cellular band transceiver 122 is configured to convert the downstream intermediate frequency signal sent by the high frequency band transceiver 121 into a downstream wireless cellular signal and send the downstream wireless cellular signal to the user equipment 300.

Optionally, the high frequency radio unit indoor-device unit 111 may connect to the high frequency radio unit—outdoor device unit 112 by using an intermediate frequency cable.

Specifically, for example, when the site 200 needs to send downstream data to the user equipment 300, the HFRU-IDU 111 may receive data sent by a baseband processing unit of the site 200, and may first convert the received data into a downstream intermediate frequency analog signal, and then send the downstream intermediate frequency analog signal to the HFRU-ODU 112 by using an intermediate frequency cable; the HFRU-ODU 112 may convert the downstream intermediate frequency analog signal into a downstream high frequency signal and send, by using an antenna feeder configured in an HFRU, the downstream high frequency signal to the SFRU 120; and after receiving the downstream high frequency signal, the SFRU 120 may convert the downstream high frequency signal into a wireless cellular signal and send the wireless cellular signal to a user equipment within a coverage range, thereby implementing wireless cellular cell coverage. Specifically, the high frequency band transceiver 121 included in the SFRU 120 may first convert the downstream high frequency signal into a downstream intermediate frequency signal, where the downstream intermediate frequency signal may be an analog signal or a digital signal, and then the wireless cellular band transceiver 122 included in the SFRU 120 may convert the downstream intermediate frequency signal into a downstream wireless cellular signal.

According to the embodiment of the present invention, if a data transmission bandwidth required for transmitting CPRI protocol data is 2.5 Gbps, when the same CPRI protocol data is converted into intermediate frequency data for transmission, a required data transmission bandwidth is only 20 Mbps, thereby remarkably saving a data transmission bandwidth and reducing data transmission complexity.

Therefore, by converting to-be-transmitted data into intermediate frequency signals for transmission, the apparatus for transmitting data according to the embodiment of the present invention can remarkably reduce a data transmission bandwidth, thereby saving bandwidth resources and reducing a data transmission cost.

On the other hand, in the apparatus for transmitting data in the embodiment of the present invention, digital processing is centralized in the HFRU-IDU, which allows the HFRU-ODU to have a smaller size and lower power consumption and improves reliability, thereby reducing a device deployment cost.

It should be understood that, in the embodiment of the present invention, the terms "downstream" and "upstream" are used to indicate transmission directions of signals or data, where the "downstream" is used to indicate that a transmission direction of a signal or data is a first direction of sending the signal or the data from a site to a user equipment of a cell, and the "upstream" is used to indicate that a transmission direction of a signal or data is a second direction of sending the signal or the data from a user equipment of a cell to a site, for example, a "downstream high frequency signal" indicates that a transmission direction of a signal is the first direction.

It should also be understood that, in the embodiment of the present invention, the terms "intermediate frequency signal", "high frequency signal", and "wireless cellular signal" are relative to signal frequencies, where a frequency of an "intermediate frequency signal" is lower than a frequency of a "wireless cellular signal", and a frequency of a "wireless cellular signal" is lower than a frequency of a "high frequency signal."

Specifically, for example, a frequency of an "intermediate frequency signal" may be between 90 MHz and 150 MHz. The present disclosure, however, is not limited thereto. For example, a frequency of an "intermediate frequency signal" may also be between 3 MHz and 50 MHz; a "wireless cellular signal" may refer to a signal in a wireless cellular communication band, for example, a frequency of a "wireless cellular signal" is between 800 MHz to 2.6 GHz; a "high frequency signal" may refer to a signal in a band higher than a wireless cellular communication band, for example, a frequency of a "high frequency signal" is between 2 GHz to 8 GHz. For another example, a frequency of a "high frequency signal" is between 10 GHz to 100 GHz. The present disclosure, however, is not limited thereto.

It should also be understood that, in the embodiment of the present invention, an "intermediate frequency signal" may be an intermediate frequency analog signal or an intermediate frequency digital signal, for example, an upstream intermediate frequency analog signal or a downstream intermediate frequency digital signal. It should also be understood that, in the embodiment of the present invention, a "high frequency signal" and a "wireless cellular signal" are transmitted over the air. Therefore, both the "high frequency signal" and the "wireless cellular signal" in the embodiment of the present invention refer to analog signals. The present disclosure, however, is not limited thereto.

In the embodiment of the present invention, optionally, the wireless cellular band transceiver 122 is further configured to convert the upstream wireless cellular signal sent by the user equipment 300 into an upstream intermediate frequency signal and send the upstream intermediate frequency signal to the high frequency band transceiver 121;

the high frequency band transceiver 121 is further configured to convert the upstream intermediate frequency signal sent by the wireless cellular band transceiver 122 into an upstream high frequency signal and send the upstream high frequency signal to the HFRU-ODU 112;

the HFRU-ODU 112 is further configured to convert the upstream high frequency signal sent by the high frequency band transceiver 121 into an upstream intermediate frequency analog signal and send the upstream intermediate frequency analog signal to the HFRU-IDU 111; and the HFRU-IDU 111 is further configured to convert the upstream intermediate frequency analog signal sent by the HFRU-ODU 112 into an upstream intermediate frequency digital signal and send the upstream intermediate frequency digital signal to the site 200.

Specifically, for example, when the user equipment 300 needs to send upstream data to the site 200, the wireless cellular band transceiver 122 included in the SFRU 120 may receive an upstream wireless cellular signal sent by the user equipment 300, and after converting the upstream wireless cellular signal into an upstream intermediate frequency signal, send the upstream intermediate frequency signal to the high frequency band transceiver 121, where the upstream intermediate frequency signal may be an upstream intermediate frequency digital signal or an upstream intermediate frequency analog signal. After converting the upstream intermediate frequency signal into an upstream high frequency signal, the high frequency band transceiver 121 sends the upstream high frequency signal to the HFRU 110 by using an air interface. After converting the upstream high frequency signal into an upstream intermediate frequency analog signal, the HFRU-ODU 112 included in the HFRU 110 may send the upstream intermediate frequency analog signal to the HFRU-IDU 111, and the HFRU-IDU 111 may convert the upstream intermediate frequency analog signal into an upstream intermediate frequency digital signal and send the upstream intermediate frequency digital signal to the site 200. This can implement upstream data transmission between a site and a user equipment and remarkably reduce a data transmission bandwidth, thereby saving bandwidth resources, reducing a data transmission cost, and reducing a device deployment cost.

Figure 3:
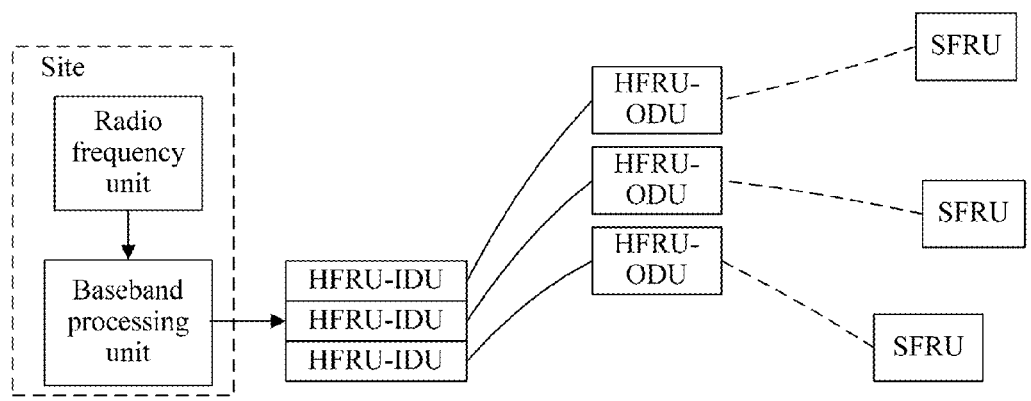
FIG. 3 is another schematic block diagram of an apparatus according to an embodiment of the present invention.

In the embodiment of the present invention, a site may be in a communication connection with one or more HFRUs. Specifically, as shown in FIG. 3, one or more HFRU-IDUs may keep a communication connection with a baseband processing unit of a site. The HFRU-IDUs may be integrated into a site or be separately deployed, and connect to a baseband processing unit by using an optical fiber, a high-speed cable, or the like; and an HFRU-ODU may be an outdoor high frequency transceiver and is configured to receive and send a high frequency signal. The present disclosure, however, is not limited thereto.

In the embodiment of the present invention, data sent by a site 200 may be CPRI protocol data or an intermediate frequency digital signal. When the data sent by the site 200 is CPRI protocol data, an HFRU-IDU 111 needs to acquire a downstream intermediate frequency digital signal from the CPRI protocol data and convert the downstream intermediate frequency digital signal into a downstream intermediate frequency analog signal; on the other hand, the HFRU-IDU 111 may also convert an upstream intermediate frequency analog signal sent by an HFRU-ODU 112 into an upstream intermediate frequency digital signal, and then convert the upstream intermediate frequency digital signal into CPRI protocol data and send the CPRI protocol data to the site 200. The present disclosure, however, is not limited thereto.

Figure 4:
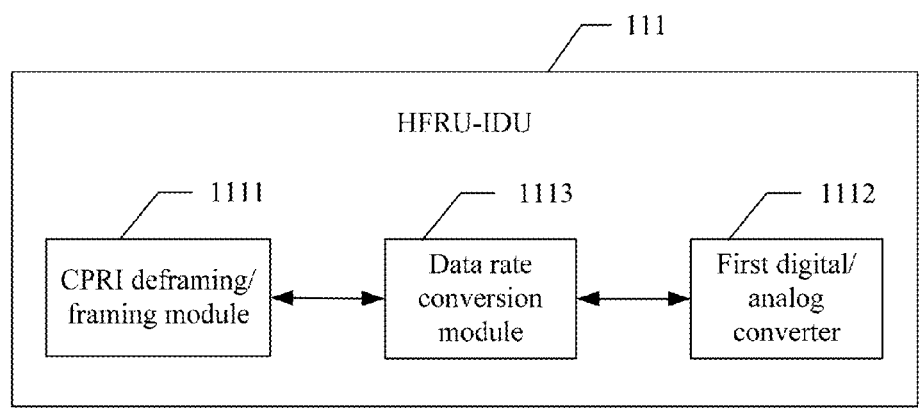
FIG. 4 is a schematic block diagram of an HFRU-IDU according to an embodiment of the present invention.

Specifically, as shown in FIG. 4, optionally, the HFRU-IDU 111 includes a common public radio interface CPRI deframing/framing module 1111 and a first digital/analog converter 1112, where the CPRI deframing/framing module 1111 is configured to acquire a downstream intermediate frequency digital signal from the CPRI protocol data sent by the site 200, and the first digital/analog converter 1112 is configured to convert the downstream intermediate frequency digital signal into the downstream intermediate frequency analog signal. The first digital/analog converter 1112 is further configured to convert the upstream intermediate frequency analog signal sent by the HFRU-ODU 112 into the upstream intermediate frequency digital signal, and the CPRI deframing/framing module 1111 is further configured to convert the upstream intermediate frequency digital signal into a CPRI data frame. The first digital/analog converter 1112 is, for example, an analog to digital converter (ADC)/digital to analog converter (DAC). The present disclosure, however, is not limited thereto.

In the embodiment of the present invention, optionally, as shown in FIG. 4, the HFRU-IDU 111 further includes a data rate conversion module 1113, where the data rate conversion module 1113 is configured to match a data rate of the downstream intermediate frequency digital signal or the upstream intermediate frequency digital signal processed by the CPRI deframing/framing module 1111 with a data rate of the downstream intermediate frequency digital signal or the upstream intermediate frequency digital signal processed by the first digital/analog converter 1112.

Specifically, when a rate at which the CPRI deframing/framing module 1111 processes a signal or data is different from a rate at which the first digital/analog converter 1112 processes a signal or data, the data rate conversion module 1113 may change a rate of the signal or the data so as to match the rate at which the CPRI deframing/framing module 1111 processes the signal or the data with the rate at which the first digital/analog converter 1112 processes the signal or the data.

For example, the data rate conversion module 1113 may increase a rate of a downstream intermediate frequency digital signal from a baseband processing unit by using an interpolation technology, so as to adapt to a rate at which the first digital/analog converter 1112 processes a signal. For another example, the data rate conversion module 1113 may lower a rate of an upstream digital signal from the first digital/analog converter 1112 by using an extraction technology, so as to adapt to a rate at which a baseband processing unit processes a signal. The embodiment of the present invention merely uses this as an example for description. The present disclosure, however, is not limited thereto. For example, when a rate at which a baseband processing unit processes a signal is higher than a rate at which the first digital/analog converter 1112 processes a signal, the data rate conversion module 1113 may lower a rate of a downstream intermediate frequency digital signal from the baseband processing unit, so as to adapt to a rate at which the first digital/analog converter 1112 processes a signal.

Figure 5:
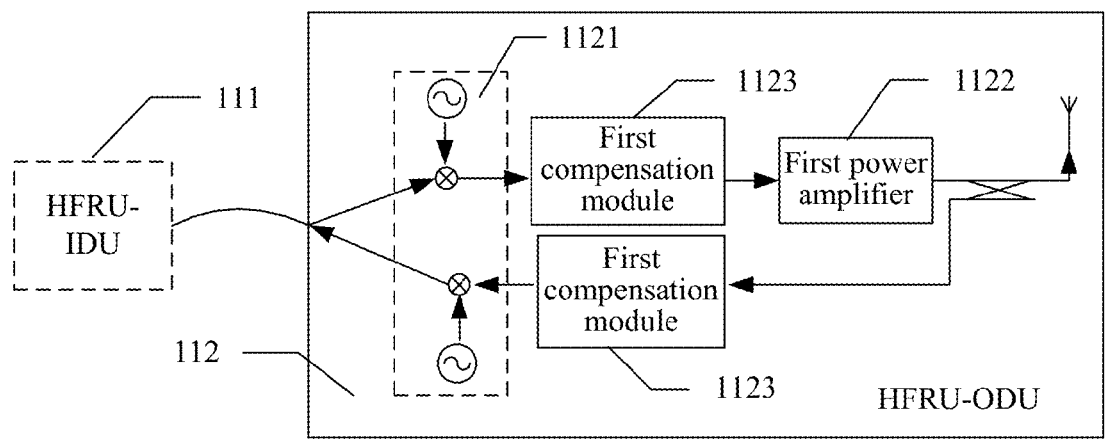
FIG. 5 is a schematic block diagram of an HFRU-ODU according to an embodiment of the present invention.

In the embodiment of the present invention, optionally, as shown in FIG. 5, the HFRU-ODU 112 includes a first frequency mixer 1121 and a first power amplifier 1122, where the first frequency mixer 1121 is configured to convert the downstream intermediate frequency analog signal into the downstream high frequency signal and convert the upstream high frequency signal into the upstream intermediate frequency analog signal, and the first power amplifier 1122 is configured to amplify the downstream high frequency signal output by the first frequency mixer 1121, so as to send the downstream high frequency signal to the SFRU 120.

Specifically, in a downstream direction, the first frequency mixer 1121 may convert a downstream intermediate frequency analog signal sent by using an intermediate frequency cable by the HFRU-IDF 111 into a downstream high frequency signal, the first power amplifier 1122 is configured to amplify the downstream high frequency signal output by the first frequency mixer 1121, and the amplified downstream high frequency signal may be sent to the SFRU 120 by using an antenna feeder; in an upstream direction, the HFRU-ODU 112 may receive an upstream high frequency signal by using an antenna feeder, the first frequency mixer 1121 is further configured to convert the upstream high frequency signal into an upstream intermediate frequency analog signal, so that the upstream intermediate frequency analog signal may be transmitted to the HFRU-IDU 111 by using an intermediate frequency cable and, after being further processed, be sent to a baseband processing unit of a site.

Figure 6:
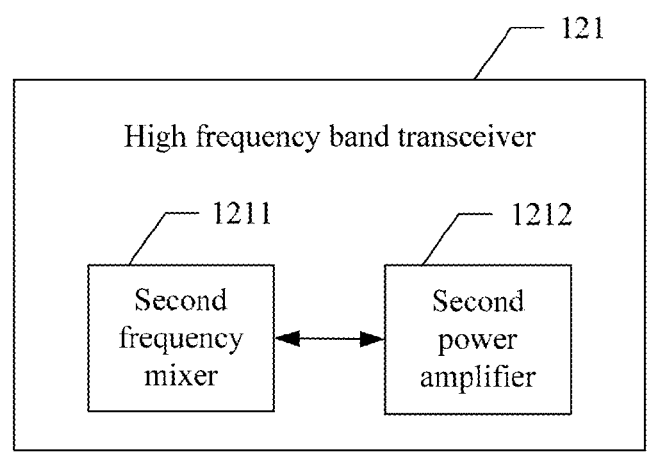
FIG. 6 is a schematic block diagram of a high frequency band transceiver according to an embodiment of the present invention.

In the embodiment of the present invention, optionally, as shown in FIG. 6, the high frequency band transceiver 121 includes a second frequency mixer 1211 and a second power amplifier 1212, where the second frequency mixer 1211 is configured to convert the downstream high frequency signal into the downstream intermediate frequency signal and convert the upstream intermediate frequency signal into the upstream high frequency signal, and the second power amplifier 1212 is configured to amplify the upstream high frequency signal output by the second frequency mixer 1211, so as to send the upstream high frequency signal to the HFRU-ODU 112.

Figure 7:
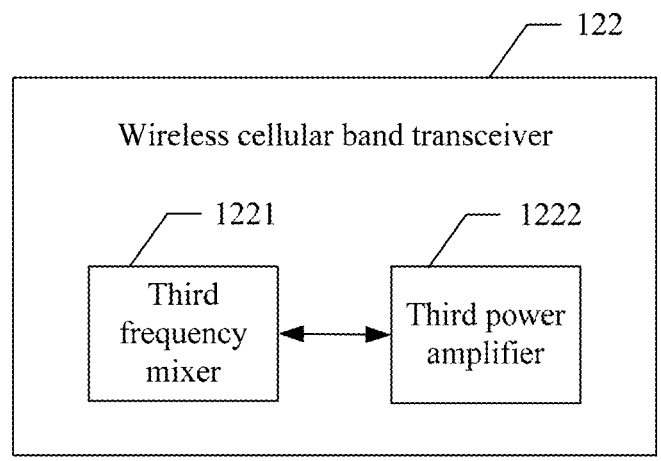
FIG. 7 is a schematic block diagram of a wireless cellular band transceiver according to an embodiment of the present invention.

Optionally, as shown in FIG. 7, the wireless cellular band transceiver 122 includes a third frequency mixer 1221 and a third power amplifier 1222, where the third frequency mixer 1221 is configured to convert the downstream intermediate frequency signal into the downstream wireless cellular signal and convert the upstream wireless cellular signal sent by the user equipment 300 into an upstream intermediate frequency signal. The third power amplifier 1222 is configured to amplify the downstream wireless cellular signal output by the third frequency mixer 1221, so as to send the downstream wireless cellular signal to the user equipment 300.

Specifically, in a downstream direction, a downstream high frequency signal sent by the HFRU-ODU 112 may be converted into a downstream intermediate frequency signal by using the second frequency mixer 1211 of the high frequency band transceiver 121, the downstream intermediate frequency signal may be converted into a downstream wireless cellular signal by using the third frequency mixer 1221 of the wireless cellular band transceiver 122, and then the downstream wireless cellular signal may be sent to the user equipment 300 by using an antenna feeder after undergoing signal power amplification performed by the third power amplifier 1222; and in an upstream direction, the third frequency mixer 1221 may convert an upstream wireless cellular signal sent by the user equipment 300 into an upstream intermediate frequency signal, and the second frequency mixer 1211 may further convert the upstream intermediate frequency signal into an upstream high frequency signal, so that the upstream high frequency signal may be sent to the HFRU-ODU 112 by using an antenna feeder.

Figure 8:
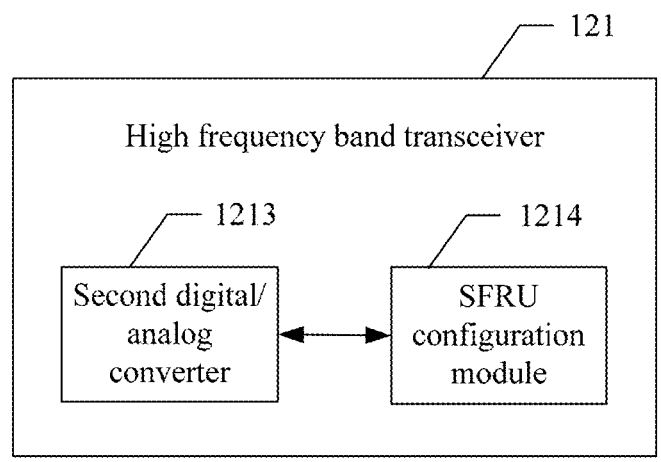
FIG. 8 is another schematic block diagram of a high frequency band transceiver according to an embodiment of the present invention.

In the embodiment of the present invention, optionally, as shown in FIG. 8, the high frequency band transceiver 121 further includes: a second digital/analog converter 1213 and an SFRU configuration module 1214, where the second digital/analog converter 1213 is configured to perform mutual conversions between an intermediate frequency analog signal and an intermediate frequency digital signal, and the SFRU configuration module 1214 is configured to control the SFRU based on the configuration management information sent by the HFRU. The SFRU configuration module 1214 is further configured to send status information about the SFRU to the HFRU.

It should be understood that, in the embodiment of the present invention, an apparatus for transmitting data not only may transmit service data of a site, but also may transmit configuration management information, status information, and so on. The configuration management information includes, for example, frequency configuration information about an SFRU, configuration information about a digital/analog converter, and channel measurement information about a wireless channel. The status information includes, for example, alarm information. The embodiment of the present invention merely uses this as an example. The present disclosure, however, is not limited thereto. For example, an apparatus for transmitting data according to an embodiment of the present invention may further transmit downstream phase noise compensation information about an emission local oscillator of an HFRU 110 or an SFRU 120. In the embodiment of the present invention, phase noise compensation information refers to phase noise compensation information.

It should also be understood that, in the embodiment of the present invention, a high frequency band transceiver and a wireless cellular band transceiver may be integrated into one unit, or may also be two independent units that are connected by using a data cable, an optical fiber, or the like. The present disclosure, however, is not limited thereto.

It should also be understood that, in the embodiment of the present invention, optionally, the downstream intermediate frequency signal includes a downstream intermediate frequency analog signal or a downstream intermediate frequency digital signal, and the upstream intermediate frequency signal includes an upstream intermediate frequency analog signal or an upstream intermediate frequency digital signal. That is, in the embodiment of the present invention, a signal transmitted between the high frequency band transceiver 121 and the wireless cellular band transceiver 122 may be an intermediate frequency digital signal or an intermediate frequency analog signal.

Specifically, in the embodiment of the present invention, in a downstream direction, the second frequency 1211 is configured to convert a downstream high frequency signal into a downstream intermediate frequency analog signal, and the third frequency mixer 1221 is configured to convert the downstream intermediate frequency signal into a downstream wireless cellular signal; and in an upstream direction, the third frequency mixer 1221 is configured to convert an upstream wireless cellular signal into an upstream intermediate frequency analog signal, and the second frequency mixer 1211 is configured to convert an upstream intermediate frequency analog signal into an upstream high frequency signal.

Figure 9:
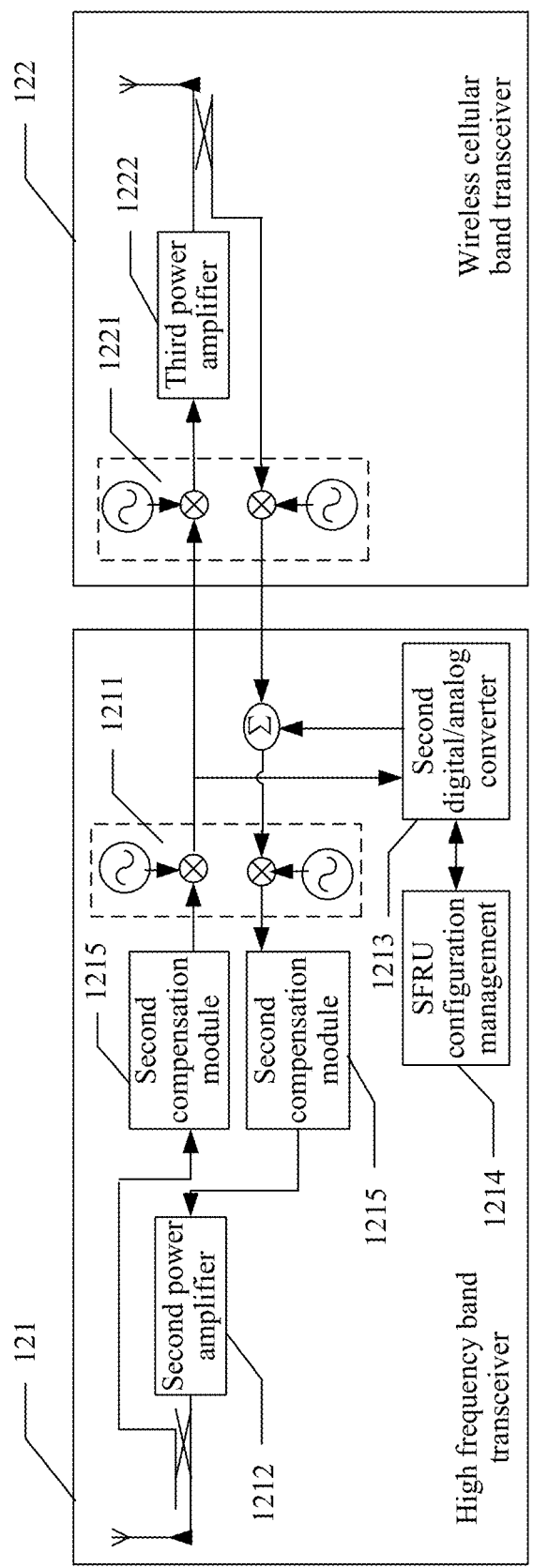
FIG. 9 is a schematic block diagram of an SFRU according to an embodiment of the present invention.

When a signal transmitted between the high frequency band transceiver 121 and the wireless cellular band transceiver 122 is an intermediate frequency analog signal, for example, as shown in FIG. 9, in a downstream direction, the second digital/analog converter 1213 is configured to convert a downstream intermediate frequency analog signal that is output by the second frequency mixer 1211 and carries configuration management information into a downstream intermediate frequency digital signal, so that the SFRU configuration module 1214 performs digital signal processing, and a downstream intermediate frequency analog signal that is output by the second frequency mixer 1211 and carries service data is directly sent to the wireless cellular band transceiver 122; and in an upstream direction, the second digital/analog converter 1213 converts an upstream intermediate frequency digital signal that is output by the SFRU configuration module 1214 and carries status information into an upstream intermediate frequency analog signal, and the intermediate frequency signals processed by the second frequency mixer 1211 and the third frequency mixer 1221 are still analog signals.

When a signal transmitted between the high frequency band transceiver 121 and the wireless cellular band transceiver 122 is an intermediate frequency digital signal, in the embodiment of the present invention, optionally, the wireless cellular band transceiver 122 further includes a third digital/analog converter 1223. The third digital/analog converter 1223 is configured to convert a downstream intermediate frequency digital signal sent by the high frequency band transceiver 121 into a downstream intermediate frequency analog signal, so that the third frequency mixer 1221 converts the downstream intermediate frequency analog signal generated by the third digital/analog converter 1223 into the downstream wireless cellular signal. The third digital/analog converter 1223 is further configured to convert an upstream intermediate frequency analog signal generated by the third frequency mixer 1221 into an upstream intermediate frequency digital signal so as to send the upstream intermediate frequency digital signal generated by the third digital/analog converter 1223 to the high frequency band transceiver 121.

Figure 10:
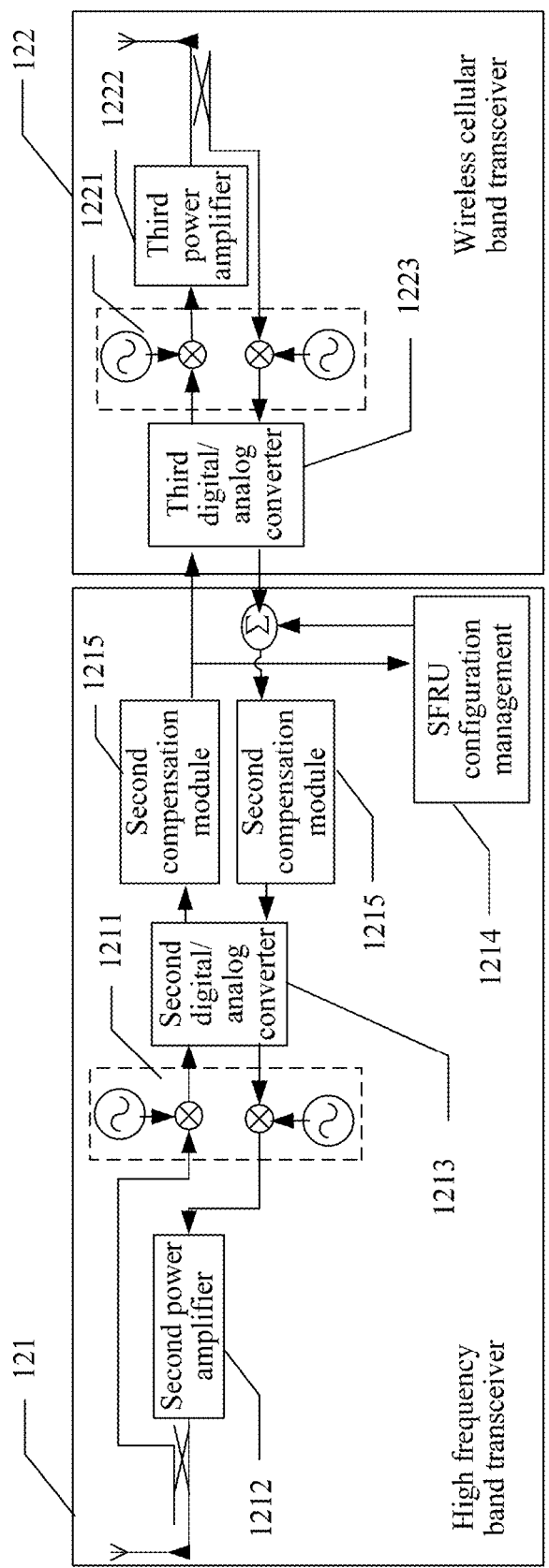
FIG. 10 is another schematic block diagram of an SFRU according to an embodiment of the present invention.

Specifically, for example, as shown in FIG. 10, in a downstream direction, the second digital/analog converter 1213 may be configured to convert all downstream intermediate frequency analog signals output by the second frequency mixer 1211 into downstream intermediate frequency digital signals, the third digital/analog converter 1223 is configured to convert a downstream intermediate frequency digital signal sent by the high frequency band transceiver 121 into a downstream intermediate frequency analog signal, and then the downstream intermediate frequency analog signal is processed by the third frequency mixer 1221; and in an upstream direction, the third digital/analog converter 1223 is configured to convert an upstream intermediate frequency analog signal sent by the third frequency mixer 1221 into an upstream intermediate frequency digital signal, and then the upstream intermediate frequency digital signal is converted by the second digital/analog converter 1213 into an upstream intermediate frequency analog signal.

Therefore, by converting to-be-transmitted data into intermediate frequency signals for transmission, the apparatus for transmitting data according to the embodiment of the present invention can remarkably reduce a data transmission bandwidth, thereby saving bandwidth resources, reducing a data transmission cost, and reducing a device deployment cost.

In the embodiment of the present invention, to further improve signal transmission quality, optionally, as shown in FIGS. 5, 9, and 10, the HFRU 110 further includes a first compensation module 113, and the high frequency band transceiver 121 further includes a second compensation module 1215, where the first compensation module 113 is configured to add downstream phase noise compensation information about an emission local oscillator of the HFRU 110 to a signal sent to the SFRU 120, and the second compensation module 1215 is configured to acquire the downstream phase noise compensation information from a signal sent by the HFRU-ODU 112, so as to perform compensation correction on the signal sent by the HFRU-ODU 112. The second compensation module 1215 is further configured to add upstream phase noise compensation information about an emission local oscillator of the SFRU 120 to a signal sent to the HFRU-ODU 112, and the first compensation module 113 is further configured to acquire the upstream phase noise compensation information from a signal sent by the high frequency band transceiver 121, so as to perform compensation correction on the signal sent by the high frequency band transceiver 121.

That is, in the embodiment of the present invention, signal transmission quality may be improved by adding redundancy information for compensation correction to an emission channel, first separating, in a receiving channel, service data from redundancy information used for correcting compensation, and using a correction compensation algorithm, where the redundancy information, for example, is downstream phase noise compensation information about an emission local oscillator of the HFRU 110 or upstream phase noise compensation information about an emission local oscillator of the SFRU 120. The present disclosure, however, is not limited thereto.

It should be understood that, in the embodiment of the present invention, signal compensation correction may be implemented in an analog domain, for example, as shown in FIG. 9, or may be implemented in a digital domain, for example, as shown in FIG. 10. When signal compensation correction is being implemented in an analog domain, for example, as shown in FIG. 5, a first compensation module 113 included in an HFRU 110 may be configured in an HFRU-ODU 112; when signal compensation correction is being implemented in a digital domain, a first compensation module 113 included in an HFRU 110 may be configured in an HFRU-IDU 111. The embodiment of the present invention merely uses this as an example for description. The present disclosure, however, is not limited thereto. For example, when signal compensation correction is being implemented in a digital domain, a first compensation module 113 may also be configured in an HFRU-ODU 112, and in this case, the first compensation module 113 may further include a digital/analog converter and so on.

Therefore, by converting to-be-transmitted data into intermediate frequency signals for transmission, the apparatus for transmitting data according to the embodiment of the present invention can remarkably reduce a data transmission bandwidth, thereby saving bandwidth resources, reducing a data transmission cost, and reducing a device deployment cost; and the apparatus for transmitting data according to the embodiment of the present invention may perform compensation correction on transmitted signals based on downstream phase noise compensation information about an emission local oscillator of an HFRU or upstream phase noise compensation information about an emission local oscillator of an SFRU, thereby improving signal transmission quality and further improving user experience.

The above described in detail the apparatus for transmitting data according to the embodiments of the present invention with reference to FIG. 1 to FIG. 10, and the following describes in detail a method for transmitting data according to the embodiments of the present invention with reference to FIG. 11 to FIG. 14.

Figure 11:
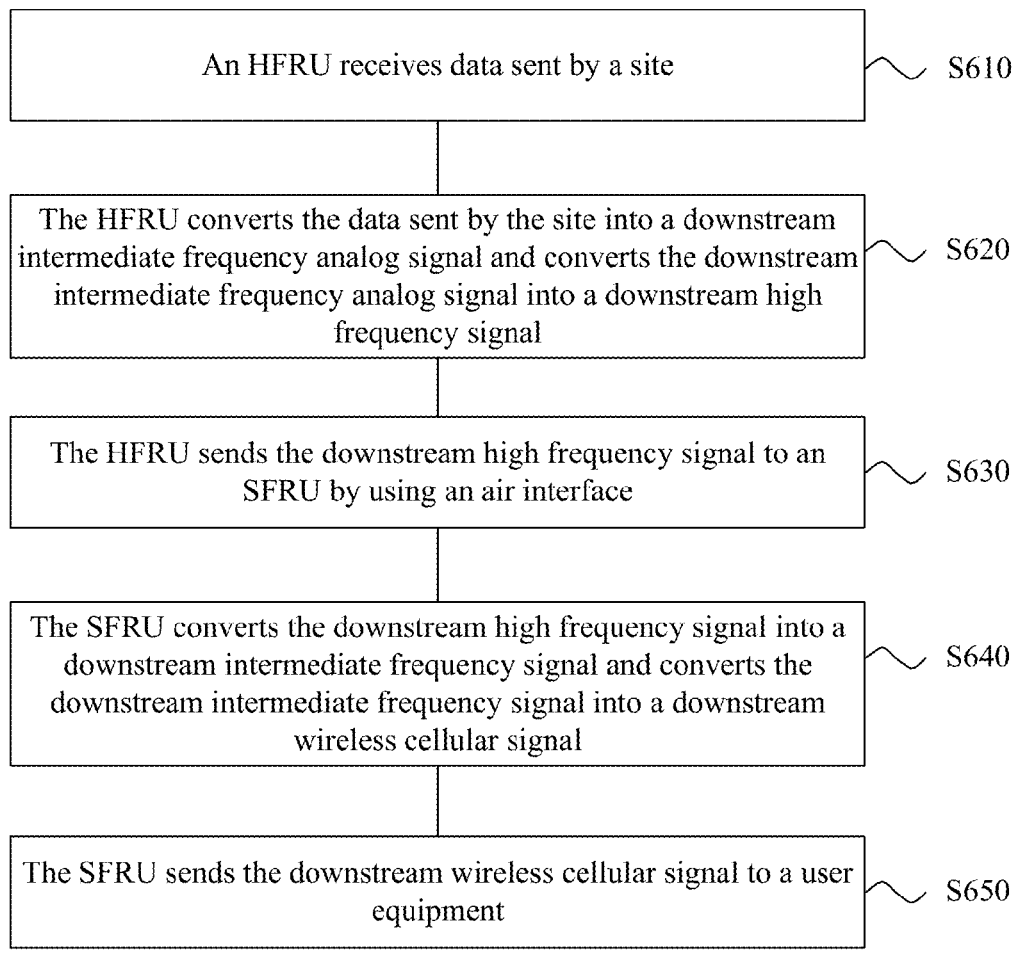
FIG. 11 is a schematic flowchart of a method for transmitting data according to an embodiment of the present invention.

FIG. 11 shows a schematic flowchart of a method 600 for transmitting data according to an embodiment of the present invention, where the method includes:

S610: A high frequency radio unit HFRU receives data sent by a site;

S620: the HFRU converts the data sent by the site into a downstream intermediate frequency analog signal and converts the downstream intermediate frequency analog signal into a downstream high frequency signal;

S630: the HFRU sends the downstream high frequency signal to a shift frequency radio unit SFRU by using an air interface;

S640: the SFRU converts the downstream high frequency signal into a downstream intermediate frequency signal and converts the downstream intermediate frequency signal into a downstream wireless cellular signal; and S650: the SFRU sends the downstream wireless cellular signal to a user equipment.

Therefore, by converting to-be-transmitted data into intermediate frequency signals for transmission, the method for transmitting data according to the embodiment of the present invention can remarkably reduce a data transmission bandwidth, thereby saving bandwidth resources, reducing a data transmission cost, and reducing a device deployment cost.

In the embodiment of the present invention, data sent by a site may be an intermediate frequency digital signal or CPRI protocol data. When the data sent by the site is CPRI protocol data, an HFRU needs to acquire a downstream intermediate frequency digital signal from the CPRI protocol data and convert the downstream intermediate frequency digital signal into a downstream intermediate frequency analog signal.

Specifically, the HFRU converts data sent by the site into a downstream intermediate frequency analog signal, including: the HFRU acquires the downstream intermediate frequency digital signal from common public radio interface CPRI protocol data sent by the site and converts the downstream intermediate frequency digital signal into the downstream intermediate frequency analog signal.

In the embodiment of the present invention, signal transmission quality may be improved by adding redundancy information for compensation correction to an emission channel, first separating, in a receiving channel, service data from redundancy information used for correcting compensation, and using a correction compensation algorithm.

Figure 12:
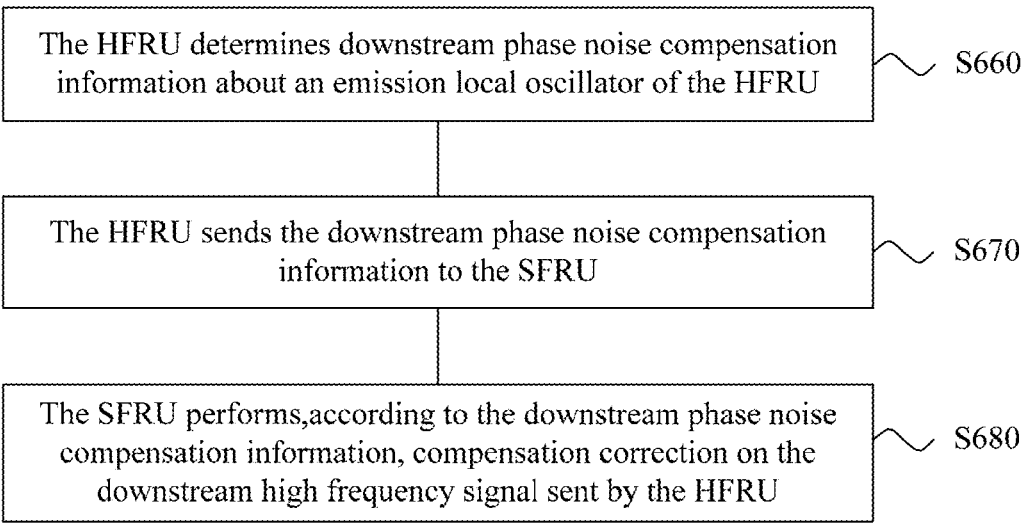
FIG. 12 is another schematic flowchart of a method for transmitting data according to an embodiment of the present invention.

Specifically, as shown in FIG. 12, optionally, the method for transmitting data according to the embodiment of the present invention further includes:

S660: The HFRU determines downstream phase noise compensation information about an emission local oscillator of the HFRU;

S670: the HFRU sends the downstream phase noise compensation information to the SFRU; and S680: the SFRU performs, according to the downstream phase noise compensation information, compensation correction for the downstream high frequency signal sent by the HFRU.

Therefore, by converting to-be-transmitted data into intermediate frequency signals for transmission, the method for transmitting data according to the embodiment of the present invention can remarkably reduce a data transmission bandwidth, thereby saving bandwidth resources, reducing a data transmission cost, and reducing a device deployment cost; and with the method for transmitting data according to the embodiment of the present invention, compensation correction may be performed on transmitted signals according to downstream phase noise compensation information about an emission local oscillator, thereby improving signal transmission quality and further improving user experience.

In the embodiment of the present invention, not only service data of a site may be transmitted but also configuration management information, status information, and so on may be transmitted. The configuration management information includes, for example, frequency configuration information about an SFRU, configuration information about a digital/analog converter, and channel measurement information about a wireless channel. The status information includes, for example, alarm information. Specifically, optionally, the method for transmitting data according to the embodiment of the present invention further includes:

the HFRU sends configuration management information about the SFRU to the SFRU; and the SFRU controls the SFRU according to the configuration management information.

Specifically, in the embodiment of the present invention, the method for transmitting downstream data includes, for example: an IDU included in the HFRU receives a downstream intermediate frequency digital signal from a baseband processing unit of a site; or an IDU deframes CPRI data from a baseband processing unit of a site and extracts a downstream intermediate frequency digital signal from a CPRI data frame; a data rate conversion module included in the HFRU increases a rate of the downstream intermediate frequency digital signal so as to match a rate of a DAC included in the HFRU; the DAC converts the downstream intermediate frequency digital signal into a downstream intermediate frequency analog signal; the downstream intermediate frequency analog signal is sent to an ODU of the HFRU by using an intermediate frequency cable; the ODU receives the downstream intermediate frequency analog signal from the IDU and converts the downstream intermediate frequency analog signal into a downstream high frequency signal by means of frequency mixer; the ODU amplifies the signal in an emission channel by using a high frequency power amplifier and emits a downstream high frequency signal that has undergone signal amplification to an SFRU by using an air interface; the SFRU receives the downstream high frequency signal from the ODU, converts the downstream high frequency signal into a downstream intermediate frequency signal by using a frequency mixer, and further converts the downstream intermediate frequency signal into a downstream wireless cellular signal by using a wireless frequency mixer; and the SFRU may amplify the downstream wireless cellular signal by using a wireless power amplifier and emit the downstream wireless cellular signal, thereby covering a wireless cellular cell.

The HFRU may also add redundancy information for compensation correction to the emission channel, and the SFRU may first separate, in a receiving channel, service data from redundancy information used for correcting compensation and use a correction compensation algorithm, so as to improve signal transmission quality. In addition, the SFRU may receive management configuration information, perform configuration management, and so on.

It should be understood that, in the embodiment of the present invention, the terms "intermediate frequency signal", "high frequency signal", and "wireless cellular signal" are relative to signal frequencies, where a frequency of an "intermediate frequency signal" is lower than a frequency of a "wireless cellular signal", and a frequency of a "wireless cellular signal" is lower than a frequency of a "high frequency signal."

Specifically, for example, a frequency of an "intermediate frequency signal" may be between 90 MHz and 150 MHz. The present disclosure, however, is not limited thereto. For example, a frequency of an "intermediate frequency signal" may also be between 3 MHz and 50 MHz; a "wireless cellular signal" may refer to a signal in a wireless cellular communication band, for example, a frequency of a "wireless cellular signal" is between 800 MHz to 2.6 GHz; a "high frequency signal" may refer to a signal in a band higher than a wireless cellular communication band, for example, a frequency of a "high frequency signal" is between 2 GHz to 8 GHz. For another example, a frequency of a "high frequency signal" is between 10 GHz to 100 GHz. The present disclosure, however, is not limited thereto.

It should also be understood that, in the embodiment of the present invention, an "intermediate frequency signal" may include an intermediate frequency analog signal or an intermediate frequency digital signal, for example, an upstream intermediate frequency analog signal or a downstream intermediate frequency digital signal. It should also be understood that, in the embodiment of the present invention, a "high frequency signal" and a "wireless cellular signal" are transmitted over the air. Therefore, both the "high frequency signal" and the "wireless cellular signal" in the embodiment of the present invention refer to analog signals. The present disclosure, however, is not limited thereto.

It should also be understood that, in the embodiments of the present invention, sequence numbers of the foregoing processes do not mean execution sequences. The execution sequences of the processes should be determined according to functions and internal logic of the processes, and should not be construed as any limitation on the implementation processes in the embodiments of the present invention.

Therefore, by converting to-be-transmitted data into intermediate frequency signals for transmission, the method for transmitting data according to the embodiment of the present invention can remarkably reduce a data transmission bandwidth, thereby saving bandwidth resources, reducing a data transmission cost, and reducing a device deployment cost.

Figure 13:
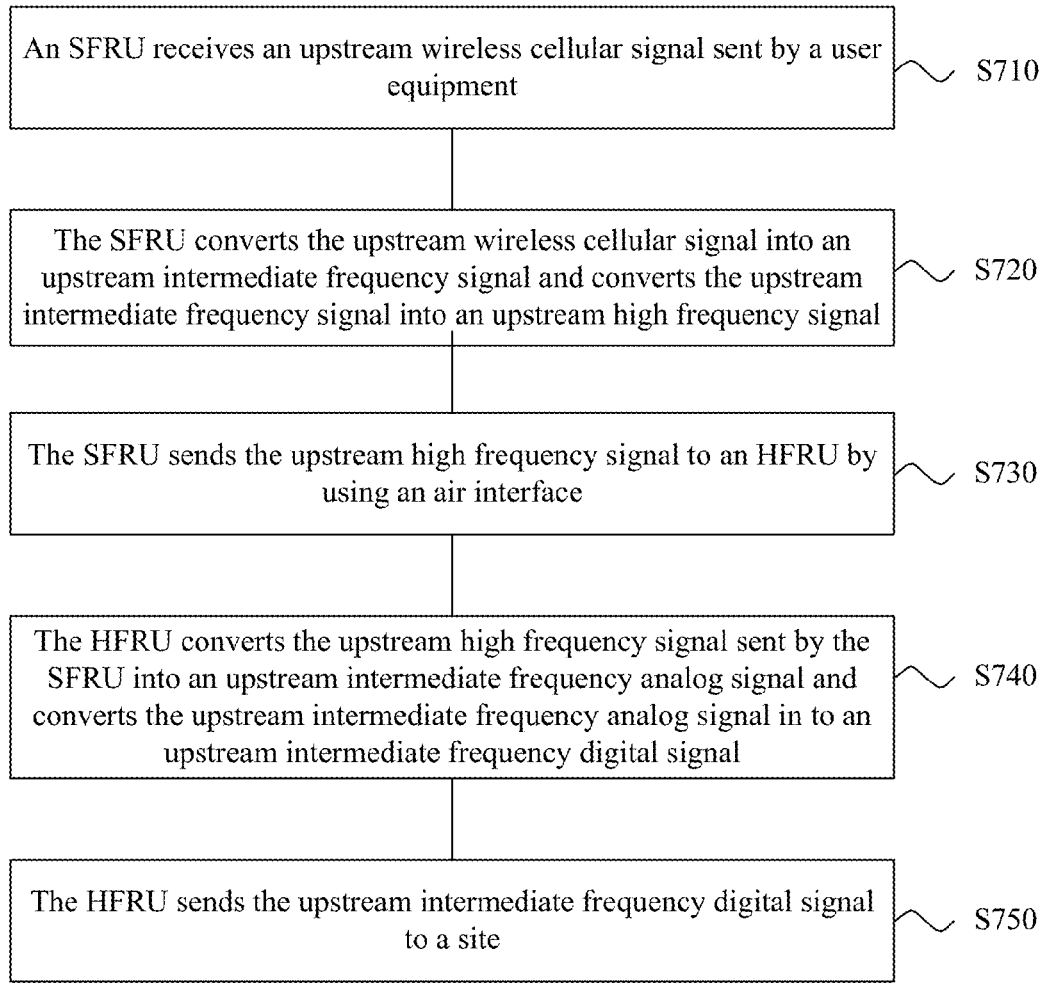
FIG. 13 is a schematic flowchart of a method for transmitting data according to another embodiment of the present invention.
Figure 14:
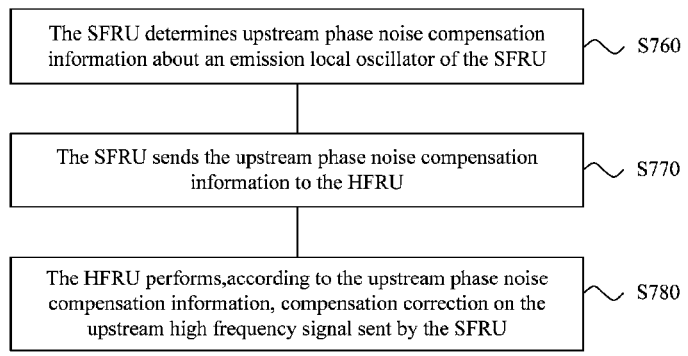
FIG. 14 is another schematic flowchart of a method for transmitting data according to another embodiment of the present invention.

The above described in detail from a downstream direction the method for transmitting data according to the embodiments of the present invention with reference to FIG. 11 to FIG. 12, and the following describes in detail from an upstream direction a method for transmitting data according to the embodiments of the present invention with reference to FIG. 13 to FIG. 14.

As shown in FIG. 13, in a system that includes a high frequency radio unit HFRU and a shift frequency radio unit SFRU, a method 700 for transmitting data includes:

S710: The SFRU receives an upstream wireless cellular signal sent by a user equipment;

S720: the SFRU converts the upstream wireless cellular signal into an upstream intermediate frequency signal and converts the upstream intermediate frequency signal into an upstream high frequency signal;

S730: the SFRU sends the upstream high frequency signal to the HFRU by using an air interface;

S740: the HFRU converts the upstream high frequency signal sent by the SFRU into an upstream intermediate frequency analog signal and converts the upstream intermediate frequency analog signal in to an upstream intermediate frequency digital signal; and S750: the HFRU sends the upstream intermediate frequency digital signal to a site.

Therefore, by converting to-be-transmitted data into intermediate frequency signals for transmission, the method for transmitting data according to the embodiment of the present invention can remarkably reduce a data transmission bandwidth, thereby saving bandwidth resources, reducing a data transmission cost, and reducing a device deployment cost.

In the embodiment of the present invention, optionally, that the HFRU sends the upstream intermediate frequency digital signal to the site includes that:

the HFRU converts the upstream intermediate frequency digital signal into a common public radio interface CPRI data frame and sends the CPRI data frame to the site.

In the embodiment of the present invention, optionally, as shown in FIG. 14, the method further includes:

S760: The SFRU determines upstream phase noise compensation information about an emission local oscillator of the SFRU;

S770: the SFRU sends the upstream phase noise compensation information to the HFRU; and S780: the HFRU performs, according to the upstream phase noise compensation information, compensation correction for the upstream high frequency signal sent by the SFRU.

In the embodiment of the present invention, optionally, the method further includes:

the SFRU determines status information about the SFRU; and the SFRU sends the status information to the HFRU.

It should be understood that, in the embodiment of the present invention, the terms "downstream" and "upstream" are used to indicate transmission directions of signals or data, where the "downstream" is used to indicate that a transmission direction of a signal or data is a first direction of sending the signal or the data from a site to a user equipment of a cell, and the "upstream" is used to indicate that a transmission direction of a signal or data is a second direction of sending the signal or the data from a user equipment of a cell to a site, for example, a "downstream high frequency signal" indicates that a transmission direction of a signal is the first direction.

It should also be understood that transmission of downstream data is corresponding to transmission of upstream data. For brevity, no repeated description is given herein.

It should also be understood that, in the embodiments of the present invention, sequence numbers of the foregoing processes do not mean execution sequences. The execution sequences of the processes should be determined according to functions and internal logic of the processes, and should not be construed as any limitation on the implementation processes in the embodiments of the present invention.

Therefore, by converting to-be-transmitted data into intermediate frequency signals for transmission, the method for transmitting data according to the embodiment of the present invention can remarkably reduce a data transmission bandwidth, thereby saving bandwidth resources, reducing a data transmission cost, and reducing a device deployment cost.

Figure 15:
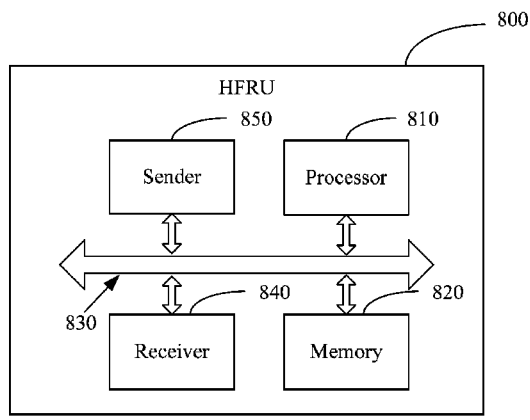
FIG. 15 is a schematic block diagram of an HFRU according to an embodiment of the present invention.

As shown in FIG. 15, an embodiment of the present invention further provides a high frequency radio unit HFRU 800. The HFRU 800 includes a processor 810, a memory 820, a bus system 830, a receiver 840, and a sender 850. The processor 810, the memory 820, the receiver 840, and the sender 850 are connected by using the bus system 830. The memory 820 is configured to store an instruction, and the processor 810 is configured to execute the instruction stored in the memory 820 so as to control signal receiving of the receiver 840 and signal sending of the sender 850. The receiver 840 is configured to receive data sent by a site; the processor 810 is configured to convert the data sent by the site into a downstream intermediate frequency analog signal and convert the downstream intermediate frequency analog signal into a downstream high frequency signal; and the sender 850 is configured to send the downstream high frequency signal to a shift radio frequency unit SFRU by using an air interface.

Therefore, by converting to-be-transmitted data into intermediate frequency signals for transmission, the HFRU according to the embodiment of the present invention can remarkably reduce a data transmission bandwidth, thereby saving bandwidth resources, reducing a data transmission cost, and reducing a device deployment cost.

It should be understood that, in the embodiment of the present invention, the processor 810 may be a central processing unit (CPU), or the processor 810 may also be another universal processor, a digital signal processor (DSP), an application-specific integrated circuit (ASIC), a field programmable gate array (FPGA) or another programmable logic device, a discrete gate or a transistor logic device, a discrete hardware assembly, or the like. A universal processor may be a microprocessor, or the processor may also be any conventional processor.

The memory 820 may include a read-only memory and a random access memory, and provides an instruction and data for the processor 810. A part of the memory 820 may further include a non-volatile random access memory. For example, the memory 820 may further store information about device types.

The bus system 830 not only includes a data bus, but also may include a power supply bus, a control bus, a status signal bus, and so on. For clearer description, however, all kinds of buses are denoted as a bus system 830 in the drawing.

In the implementation process, the steps of the foregoing method may be implemented by integrated logic circuits of hardware in the processor 810 or by software instructions. The steps of the method disclosed in the embodiment of the present invention may be executed by a hardware processor directly, or by a combination of hardware and software modules in the processor. The software modules may be located in a random access memory, a flash memory, a read-only memory, a programmable read-only memory, an electrically erasable programmable memory, a register, or any other storage media that are mature in the art. The storage media are located in the memory 820, and the processor 810 reads information in the memory 820 and works together with its hardware to implement the steps of the foregoing method. To avoid repetition, no more details are given herein.

Optionally, as an embodiment, the processor 810 converts data sent by the site into a downstream intermediate frequency analog signal, including: acquiring a downstream intermediate frequency digital signal from common public radio interface CPRI protocol data sent by the site, and converting the downstream intermediate frequency digital signal into the downstream intermediate frequency analog signal.

Optionally, as an embodiment, the processor 810 is further configured to determine downstream phase noise compensation information about an emission local oscillator of the HFRU; and the sender 850 is further configured to send the downstream phase noise compensation information to the SFRU.

Optionally, as an embodiment, the sender 850 is further configured to send configuration management information about the SFRU to the SFRU.

Optionally, as an embodiment, the receiver 840 is further configured to receive an upstream high frequency signal sent by an SFRU; the processor 810 is further configured to convert the upstream high frequency signal into an upstream intermediate frequency analog signal and convert the upstream intermediate frequency analog signal into an upstream intermediate frequency digital signal; and the sender 850 is further configured to send the upstream intermediate frequency digital signal to a site.

Further optionally, as an embodiment, the processor 810 is further configured to convert the upstream intermediate frequency digital signal into a common public radio interface CPRI data frame; and that the sender 850 sends the upstream intermediate frequency digital signal to a site is that the sender 850 sends the CPRI data frame to the site.

Optionally, as an embodiment, the receiver 840 is further configured to receive upstream phase noise compensation information sent by an SFRU; and the processor 810 is further configured to perform compensation correction on an upstream high frequency signal according to the upstream phase noise compensation information.

Optionally, as an embodiment, the sender 840 is further configured to receive status information about the SFRU that is sent by an SFRU.

It should be understood that, the HFRU 800 according to the embodiment of the present invention may correspond to the HFRU 110 in the embodiment of the present invention and may correspond to a corresponding body that executes the method according to the embodiment of the present invention, and the foregoing and other operations and/or functions of each module in the HFRU 800 are intended for implementing corresponding procedures of each method in FIG. 11 to FIG. 14. For brevity, no repeated description is given herein.

Therefore, by converting to-be-transmitted data into intermediate frequency signals for transmission, the HFRU according to the embodiment of the present invention can remarkably reduce a data transmission bandwidth, thereby saving bandwidth resources, reducing a data transmission cost, and reducing a device deployment cost.

Figure 16:
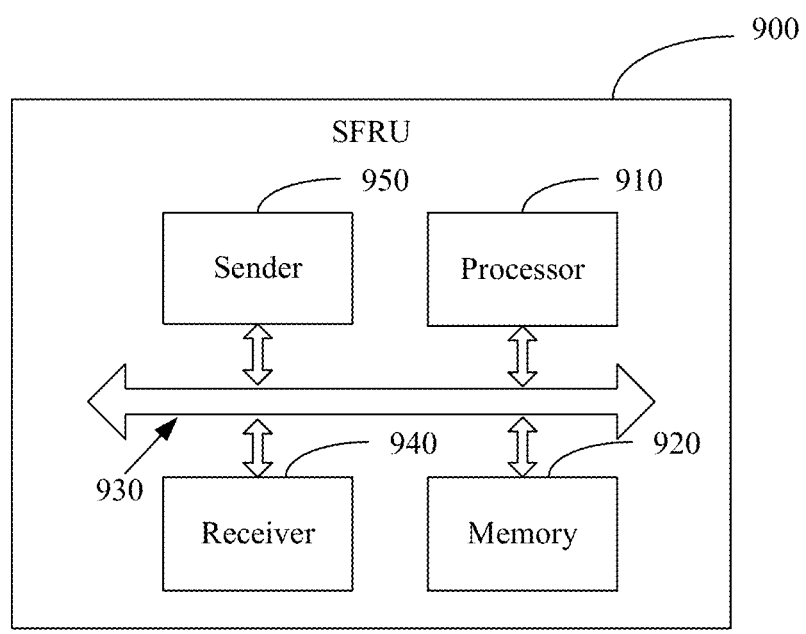
FIG. 16 is still another schematic block diagram of an SFRU according to an embodiment of the present invention.

As shown in FIG. 16, an embodiment of the present invention further provides a shift frequency radio unit SFRU 900 that includes a processor 910, a memory 920, a bus system 930, a receiver 940, and a sender 950. The processor 910, the memory 920, the receiver 940, and the sender 950 are connected by using the bus system 930. The memory 920 is configured to store an instruction, and the processor 910 is configured to execute the instruction stored in the memory 920 to control signal receiving of the receiver 940 and signal sending of the sender 950. The receiver 940 is configured to receive a downstream high frequency signal sent by using an air interface by an HFRU; the processor 910 is configured to convert the downstream high frequency signal into a downstream intermediate frequency signal and convert the downstream intermediate frequency signal into a downstream wireless cellular signal; and the sender 950 is configured to send the downstream wireless cellular signal to a user equipment.

Therefore, by converting to-be-transmitted data into intermediate frequency signals for transmission, the SFRU according to the embodiment of the present invention can remarkably reduce a data transmission bandwidth, thereby saving bandwidth resources, reducing a data transmission cost, and reducing a device deployment cost.

It should be understood that, in the embodiment of the present invention, the processor 910 may be a central processing unit (CPU), or the processor 910 may also be another universal processor, a digital signal processor (DSP), an application-specific integrated circuit (ASIC), a field programmable gate array (FPGA) or another programmable logic device, a discrete gate or a transistor logic device, a discrete hardware assembly, or the like. A universal processor may be a microprocessor, or the processor may also be any conventional processor.

The memory 920 may include a read-only memory and a random access memory, and provides an instruction and data for the processor 910. A part of the memory 920 may further include a non-volatile random access memory. For example, the memory 920 may further store information about device types.

The bus system 930 not only includes a data bus, but also may include a power supply bus, a control bus, a status signal bus, and so on. For clearer description, however, all kinds of buses are denoted as a bus system 930 in the drawing.

In the implementation process, the steps of the foregoing method may be implemented by integrated logic circuits of hardware in the processor 910 or by software instructions. The steps of the method disclosed in the embodiment of the present invention may be executed by a hardware processor directly, or by a combination of hardware and software modules in the processor. The software modules may be located in a random access memory, a flash memory, a read-only memory, a programmable read-only memory, an electrically erasable programmable memory, a register, or any other storage media that are mature in the art. The storage media are located in the memory 920, and the processor 910 reads information in the memory 920 and works together with its hardware to implement the steps of the foregoing method. To avoid repetition, no more details are given herein.

Optionally, as an embodiment, the receiver 940 is further configured to receive downstream phase noise compensation information sent by an HFRU; and the processor 910 is further configured to perform compensation correction on a downstream high frequency signal according to the downstream phase noise compensation information.

Optionally, as an embodiment, the receiver 940 is further configured to receive configuration management information sent by an HFRU about an SFRU; and the processor 910 is further configured to control the SFRU according to the configuration management information.

Optionally, as an embodiment, the receiver 940 is further configured to receive an upstream wireless cellular signal sent by a user equipment; the processor 910 is further configured to convert the upstream wireless cellular signal into an upstream intermediate frequency signal and convert the upstream intermediate frequency signal into an upstream high frequency signal; and the sender 950 is further configured to send the upstream high frequency signal to the HFRU by using an air interface.

Optionally, as an embodiment, the processor 910 is further configured to determine upstream phase noise compensation information about an emission local oscillator of the SFRU; and the sender 950 is further configured to send the upstream phase noise compensation information to the HFRU.

Optionally, as an embodiment, the processor 910 is further configured to determine status information about the SFRU; and the sender 950 is further configured to send the status information to the HFRU.

It should be understood that, the SFRU 900 according to the embodiment of the present invention may correspond to the SFRU 120 in the embodiments of the present invention and may correspond to a corresponding body that executes the method according to the embodiment of the present invention, and the foregoing and other operations and/or functions of each module in the SFRU 900 are intended for implementing corresponding procedures of each method in FIG. 11 to FIG. 14. For brevity, no repeated description is given herein.

Therefore, by converting to-be-transmitted data into intermediate frequency signals for transmission, the SFRU according to the embodiment of the present invention can remarkably reduce a data transmission bandwidth, thereby saving bandwidth resources, reducing a data transmission cost, and reducing a device deployment cost.

In addition, the terms "system" and "network" may be used interchangeably in this specification. The term "and/or" in this specification describes only an association relationship for describing associated objects and represents that three relationships may exist. For example, A and/or B may represent the following three cases: A exists alone, both A and B exist at the same time, and B exists alone. In addition, the character "/" in this specification generally indicates an "or" relationship between the associated objects.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions in the embodiments of the present invention.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

According to the description of the foregoing embodiments, it is understandable to those skilled in the art that the embodiments of the present invention may be implemented by hardware or by firmware or a combination thereof. When the embodiments of the present invention are implemented by software, the above functions may be stored in a computer readable medium or serve as one or multiple instructions or codes on the computer readable medium for transmission. The computer readable medium includes a computer storage medium and a communication medium, where the communication medium includes any medium for conveniently transmitting computer programs from one place to another place. The storage medium may be any available medium that the computer can access. For example, the computer readable medium may include but is not limited to: a RAM, a ROM, an EEPROM, a CD-ROM, or other optical disk storage and magnetic disk storage media or other magnetic storage devices, or any other computer accessible medium that can be used to carry or store desired program codes having instructions or data structure forms. In addition, any connection may become a computer readable medium properly. For example, if software is transmitted from a website, a server, or other remote sources by using a coaxial cable, an optical cable, a twisted pair cable, or a digital subscriber line (DSL), or a wireless technology such as infrared, radio, and microwave, the coaxial cable, optical cable, twisted pair cable, or DSL, or the wireless technology such as infrared, radio, and microwave is included in the fixing of the medium. For example, the disk and disc used in the embodiments of the present invention include a compact disc (CD), a laser disc, an optical disc, a digital versatile disc (DVD), a floppy disk, and a blue-ray disc, where the disk is usually used to replicate data magnetically while the disc uses laser to replicate data optically. The above combination should also be within the protection scope of the computer readable medium.

In summary, the foregoing descriptions are merely exemplary embodiments of the technical solutions of the present invention, but are not intended to limit the protection scope of the present disclosure. Any modification, equivalent replacement, and improvement made without departing from the spirit and principle of the present disclosure shall fall within the protection scope of the present application.

What is claimed is:

1. An apparatus for transmitting data comprising:
a high frequency radio unit (HFRU) that is in a communication connection with a site; and
a shift frequency radio unit (SFRU) that is in a communication connection with the HFRU and with a user equipment, wherein:
the HFRU comprises a high frequency radio unit—indoor device unit (HFRU-IDU) and a high frequency radio unit—outdoor device unit (HFRU-ODU) that connects to the HFRU-IDU, and the SFRU comprises a high frequency band transceiver and a wireless cellular band transceiver;
the HFRU-IDU is configured to convert data sent by the site into a downstream intermediate frequency analog signal and send the downstream intermediate frequency analog signal to the HFRU-ODU;
the HFRU-ODU is configured to convert the downstream intermediate frequency analog signal sent by the HFRU-IDU into a downstream high frequency signal and send the downstream high frequency signal to the SFRU by using an air interface;
the high frequency band transceiver is configured to convert the downstream high frequency signal sent by the HFRU-ODU into a downstream intermediate frequency signal and send the downstream intermediate frequency signal to the wireless cellular band transceiver;
the wireless cellular band transceiver is configured to convert the downstream intermediate frequency signal sent by the high frequency band transceiver into a downstream wireless cellular signal and send the downstream wireless cellular signal to the user equipment; and
the HFRU-IDU comprises a common public radio interface (CPRI) deframing/framing module and a first digital/analog converter, wherein:
the CPRI deframing/framing module is configured to acquire a downstream intermediate frequency digital signal from CPRI protocol data sent by the site,
the first digital/analog converter is configured to (a) convert the downstream intermediate frequency digital signal into a downstream intermediate frequency analog signal and (b) convert the upstream intermediate frequency analog signal sent by the HFRU-ODU into the upstream intermediate frequency digital signal, and
the CPRI deframing/framing module is further configured to convert the upstream intermediate frequency digital signal into a CPRI data frame.

2. The apparatus according to claim 1, wherein:
the high frequency band transceiver is further configured to convert an upstream wireless cellular signal sent by the user equipment into an upstream intermediate frequency signal and send the upstream intermediate frequency signal to the high frequency band transceiver;
the high frequency band transceiver is further configured to convert the upstream intermediate frequency signal sent by the wireless cellular band transceiver into an upstream high frequency signal and send the upstream high frequency signal to the HFRU-ODU;
the HFRU-ODU is further configured to convert the upstream high frequency signal sent by the high frequency band transceiver into an upstream intermediate frequency analog signal and send the upstream intermediate frequency analog signal to the HFRU-IDU; and the HFRU-IDU is further configured to convert the upstream intermediate frequency analog signal sent by the HFRU-ODU into an upstream intermediate frequency digital signal and send the upstream intermediate frequency digital signal to the site.

3. The apparatus according to claim 1, wherein the HFRU-IDU further comprises a data rate conversion module configured to match a data rate of the downstream intermediate frequency digital signal or the upstream intermediate frequency digital signal processed by the CPRI deframing/framing module with a data rate of the downstream intermediate frequency digital signal or the upstream intermediate frequency digital signal processed by the first digital/analog converter.

4. The apparatus according to claim 1, wherein the HFRU-ODU comprises:
a first frequency mixer configured to convert the downstream intermediate frequency analog signal into the downstream high frequency signal and convert the upstream high frequency signal into the upstream intermediate frequency analog signal; and
a first power amplifier configured to amplify the downstream high frequency signal output by the first frequency mixer so as to send the downstream high frequency signal to the SFRU.

5. The apparatus according to claim 1, wherein the high frequency band transceiver comprises:
a second frequency mixer is configured to convert the downstream high frequency signal into the downstream intermediate frequency signal and convert the upstream intermediate frequency signal into the upstream high frequency signal; and
a second power amplifier is configured to amplify the upstream high frequency signal output by the second frequency mixer so as to send the upstream high frequency signal to the HFRU-ODU.

6. The apparatus according to claim 5, wherein the high frequency band transceiver further comprises:
a second digital/analog converter configured to perform mutual conversions between an intermediate frequency analog signal and an intermediate frequency digital signal; and
an SFRU configuration module configured to:
control the SFRU according to the configuration management information sent by the HFRU, and
send status information about the SFRU to the HFRU.

7. The apparatus according to claim 1, wherein the wireless cellular band transceiver comprises:
a third frequency mixer configured to convert the downstream intermediate frequency signal into the downstream wireless cellular signal and convert the upstream wireless cellular signal sent by the user equipment into the upstream intermediate frequency signal; and
a third power amplifier configured to amplify the downstream wireless cellular signal output by the third frequency mixer so as to send the downstream wireless cellular signal to the user equipment.

8. The apparatus according to claim 7, wherein the wireless cellular band transceiver further comprises a third digital/analog converter configured to:
convert the downstream intermediate frequency digital signal sent by the high frequency band transceiver into the downstream intermediate frequency analog signal, so that the third frequency mixer converts a downstream intermediate frequency analog signal generated by the third digital/analog converter into the downstream wireless cellular signal; and
convert an upstream intermediate frequency analog signal generated by the third frequency mixer into an upstream intermediate frequency digital signal, so that the upstream intermediate frequency digital signal generated by the third digital/analog converter is sent to the high frequency band transceiver.

9. The apparatus according to claim 1, wherein:
the HFRU further comprises a first compensation module, and
the high frequency band transceiver further comprises a second compensation module,
the first compensation module is configured to add downstream phase noise compensation information about an emission local oscillator of the HFRU to a signal that is sent to the SFRU, and the second compensation module is configured to acquire the downstream phase noise compensation information from a signal sent by the HFRU-ODU, so as to perform compensation correction on the signal sent by the HFRU-ODU; and
the second compensation module is further configured to add upstream phase noise compensation information about an emission local oscillator of the SFRU to a signal that is sent to the HFRU-ODU, and the first compensation module is further configured to acquire the upstream phase noise compensation information from a signal sent by the high frequency band transceiver, to perform compensation correction on the signal sent by the high frequency band transceiver.

10. A method for transmitting data comprising:
receiving, by a high frequency radio unit (HFRU), data sent by a site;
converting, by the HFRU, the data sent by the site into a downstream intermediate frequency analog signal, and converting the downstream intermediate frequency analog signal into a downstream high frequency signal;
sending, by the HFRU, the downstream high frequency signal to a shift frequency radio unit (SFRU) by using an air interface;
converting, by the SFRU, the downstream high frequency signal into a downstream intermediate frequency signal, and converting the downstream intermediate frequency signal into a downstream wireless cellular signal;
sending, by the SFRU, the downstream wireless cellular signal to a user equipment;
determining, by the HFRU, downstream phase noise compensation information about an emission local oscillator of the HFRU;
sending, by the HFRU, the downstream phase noise compensation information to the SFRU; and
performing, by the SFRU according to the downstream phase noise compensation information, compensation correction for the downstream high frequency signal sent by the HFRU.

11. The method according to claim 10, wherein the converting, by the HFRU, the data sent by the site into a downstream intermediate frequency analog signal comprises:
acquiring, by the HFRU, a downstream intermediate frequency digital signal from common public radio interface (CPRI) protocol data sent by the site, and converting the downstream intermediate frequency digital signal into the downstream intermediate frequency analog signal.

12. The method according to claim 10, further comprising:
    sending, by the HFRU, configuration management information about the SFRU to the SFRU; and
    controlling, by the SFRU, the SFRU according to the configuration management information.

13. A method for transmitting data comprising:
    receiving, by a shift frequency radio unit (SFRU), an upstream wireless cellular signal sent by a user equipment;
    converting, by the SFRU, the upstream wireless cellular signal into an upstream intermediate frequency signal, and converting the upstream intermediate frequency signal into an upstream high frequency signal;
    sending, by the SFRU, the upstream high frequency signal to a high frequency radio unit (HFRU) by using an air interface;
    converting, by the HFRU, the upstream high frequency signal sent by the SFRU into an upstream intermediate frequency analog signal, and converting the upstream intermediate frequency analog signal into an upstream intermediate frequency digital signal;
    sending, by the HFRU, the upstream intermediate frequency digital signal to a site;
    determining, by the SFRU, upstream phase noise compensation information about an emission local oscillator of the SFRU;
    sending, by the SFRU, the upstream phase noise compensation information to the HFRU; and
    performing, by the HFRU according to the upstream phase noise compensation information compensation correction for the upstream high frequency signal sent by the SFRU.

14. The method according to claim 13, wherein the sending, by the HFRU, the upstream intermediate frequency digital signal to a site comprises:
    converting, by the HFRU, the upstream intermediate frequency digital signal into a common public radio interface (CPRI) data frame, and sending the CPRI data frame to the site.

15. The method according to claim 13, further comprising:
    determining, by the SFRU, status information about the SFRU; and
    sending, by the SFRU, the status information to the HFRU.

* * * * *

UNITED STATES PATENT AND TRADEMARK OFFICE
CERTIFICATE OF CORRECTION

PATENT NO. : 9,924,374 B2  
APPLICATION NO. : 15/197362  
DATED : March 20, 2018  
INVENTOR(S) : Wang et al.

Page 1 of 1

It is certified that error appears in the above-identified patent and that said Letters Patent is hereby corrected as shown below:

On the Title Page

Page 2, item (56) "U.S. Patent Documents," US 6,340,200 B1 publication date should read -- 01/2002 --.

Signed and Sealed this  
Third Day of July, 2018

Andrei Iancu  
*Director of the United States Patent and Trademark Office*